United States Patent
Popovic

(10) Patent No.: US 7,292,751 B2
(45) Date of Patent: Nov. 6, 2007

(54) OPTICAL COUPLED-RESONATOR FILTERS WITH ASYMMETRIC COUPLING

(75) Inventor: Milos Popovic, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 11/329,743

(22) Filed: Jan. 11, 2006

(65) Prior Publication Data

US 2006/0159392 A1    Jul. 20, 2006

(51) Int. Cl.
  *G02B 6/26*  (2006.01)
  *G02F 1/035* (2006.01)
(52) U.S. Cl. ................... 385/32; 385/140; 359/247; 359/278
(58) Field of Classification Search .................. 385/32, 385/140; 359/247, 278
  See application file for complete search history.

(56) References Cited

U.S. PATENT DOCUMENTS

| 4,097,826 A | 6/1978 | Knox et al. | |
|---|---|---|---|
| 6,052,495 A | 4/2000 | Little et al. | |
| 2004/0202430 A1* | 10/2004 | Scheuer et al. | ............... 385/50 |

FOREIGN PATENT DOCUMENTS

| DE | 10219244 A | 11/2003 |
|---|---|---|
| JP | 2001258308 | 8/2001 |
| WO | WO 98/05995 | 2/1998 |
| WO | WO 01/27692 | 10/2000 |
| WO | WO 02/23242 A2 | 3/2002 |

OTHER PUBLICATIONS

Little et al., "Microring Resonator Channel Dropping Filters," Journal of Lightwave Technology IEEE., New York, vol. 15, No. 6, Jun. 1, 1997, pp. 998-1005.
Yanagase et al., "Box-Like Filter Response and Expansion of FSR by a Vertically Triple Coupled Microring Resonator Filter" Journal of Lightwave Technology, vol. 20, No. 8, Aug. 1, 2002, pp. 1525-1529.
Khan et al., "Mode-Coupling Analysis of Multipole Symmetric Resonant Add/Drop Filters" Journal of Quantum Electronics, vol. 35, No. 10, Oct. 1999, pp. 1451-1460.
Vörckel et al., "Asymmetrically Coupled Silicon-On-Insulator Microring Resonators for Compact Add-Drop Multiplexers" Photonics Technology Letters, vol. 15, No. 7, Jul. 2003, pp. 921-923.
Griffel, "Vrenier Effect in Asymmetrical Ring Resonator Arrays" Photonics Technology Letters, vol. 12, No. 12, Dec. 2000, pp. 1642-1644.
Schwelb et al., "Vernier Operation of Series-Coupled Optical Microring Resonator Filters" Microwave and Optical Technology Letters, vol. 39, No. 4. Nov. 22, 2003, pp. 257-261.

(Continued)

Primary Examiner—Sung Pak
Assistant Examiner—Jerry T. Rahil
(74) Attorney, Agent, or Firm—Gauthier & Connors LLP

(57) ABSTRACT

An optical filter includes at least one waveguide structure. The optical filter also includes a plurality of optical resonators that are aligned in an coupled arrangement with the at least one waveguide structure so as to produce an asymmetric distribution of coupling coefficients.

28 Claims, 33 Drawing Sheets

OTHER PUBLICATIONS

Scobey et al. "Hybrid thin film WDM and optical switch devices for optical add/drop" OCLI Telecommunications Division, pp. WM42-1/335-WM42-3/337.

Vörckel et al., "Asymmetrically Coupled Silicon-On-Insulator Microning Resonators for Compact Add-Drop Multiplexers" Photonics Technology Letters, vol. 15, No. 7, Jul. 2003, pp. 921-923.

Williams et al., "Predistortion Techniques for Multicoupled Resonator Filters" Transactions on Microwave Theory and Techniques, vol. MIT-33, No. 5, May 1985, pp. 402-407.

Monolatou et al., "Coupling of Modes Analysis of Resonant Channel Add-Drop Filters" Journal of Quantum Electronics, vol. 35, No. 9, Sep. 1999, pp. 1322-1331.

Hryniewicz et al., "Higher Order Filter Response in Coupled Microning Resonators" Photonics Technology Letters, vol. 12, No. 3, Mar. 2000, pp. 320-322.

Orta et al., "Synthesis of Multiple-Ring-Resonator Filters for Optical Systems" Photonics Technology Letters, vol. 7, No. 12, Dec. 1995, pp. 1447-1449.

Melloni, et al., "Synthesis of Direct-Coupled-Resonators Bandpass Filters for WDM Systems" Journal of Lightwave Technology, vol. 20, No. 2, Feb. 2002, pp. 296-303.

Rabus et al., "Optical Filters Based on Ring Resonators With Integrated Semiconductor Optical Amplifiers in GaInAsP-InP" Journal of Selected Topics in Quantum Electronics, vol. 8, No. 6, Nov./Dec. 2002, pp. 1405-1411.

Chu et al., "Cascaded Microring Resonators for Crosstalk Reduction and Spectrum Cleanup in Add-Drop Filters" Photonics Technology Letters, vol. 11, No. 11, Nov. 1999, pp. 1423-1425.

* cited by examiner

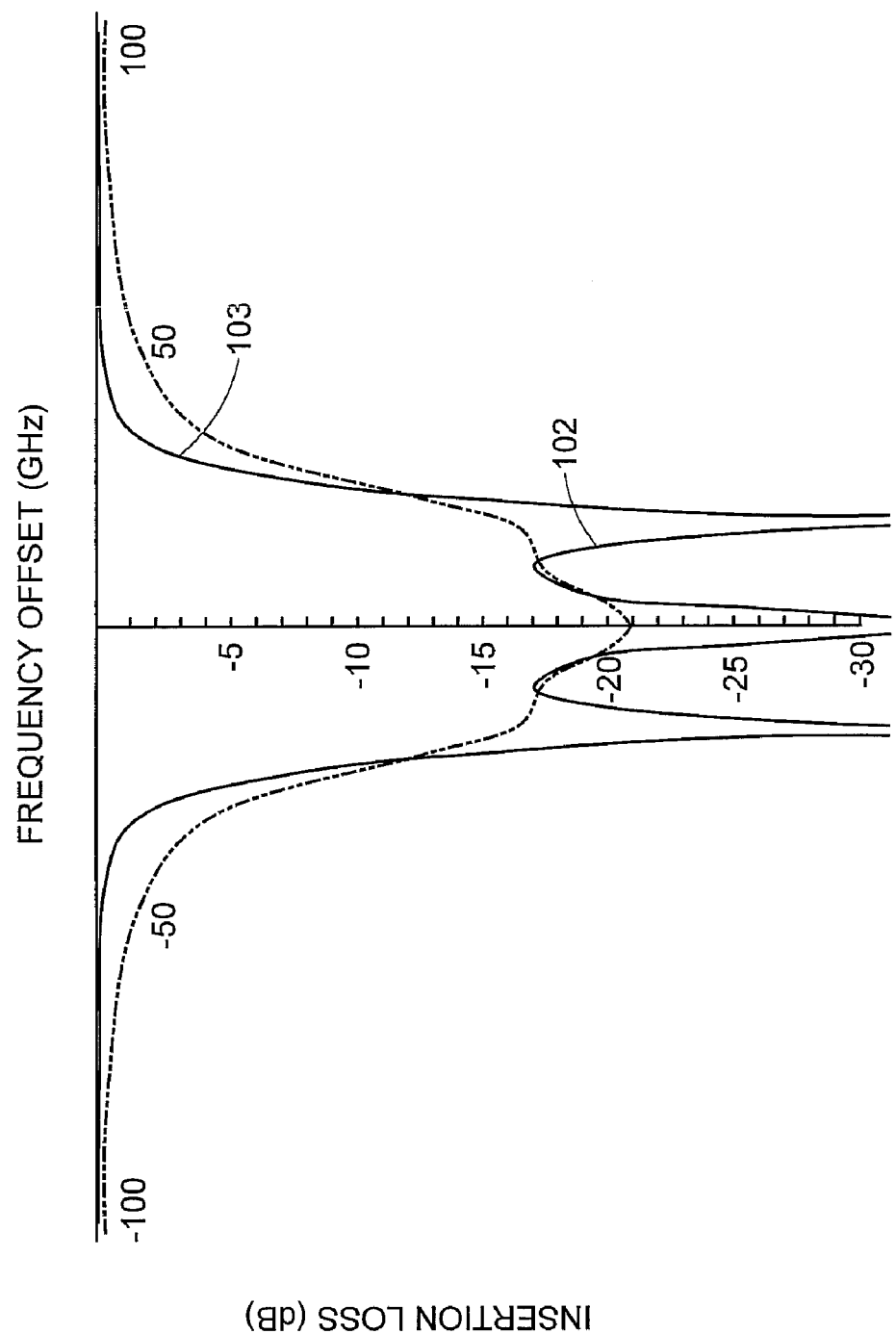

OPTICAL COUPLED-RESONATOR FILTERS WITH ASYMMETRIC COUPLING

PRIORITY INFORMATION

This application claims priority to International Application No. PCT/US2004/022795 filed Jul. 15, 2004, which claims priority to U.S. Provisional Application Ser. No. 60/487,548, filed on Jul. 15, 2003 which are incorporated herein in their entirety.

BACKGROUND OF THE INVENTION

The invention relates to the field of optical communication, and in particular to a technique of design for prescribed spectral characteristics for, and a means of realization of, optical coupled-resonator wavelength (channel add/drop) filters in which the resonators have finite loss, or of optical coupled-resonator wavelength-selective tap filters where only a fraction of the total power at a selected wavelength is to be extracted (e.g. for channel monitoring applications).

In wavelength-division-multiplexed (WDM) optical communication networks, the optical add/drop multiplexer (OADM) permits the extraction of one or more wavelengths from the signal spectrum of the bus fiber onto secondary optical paths, and the insertion of new optical signals into these same, now vacant, spectral slots. The channel add/drop filter (CADF) is the functional component of the OADM which performs the drop and add operations for one channel at a given (fixed or tunable) center wavelength. Generally filter characteristics with low loss, a flat-top and sharp rolloff drop-port response, and strong in-band extinction in the thru-port are desirable. Channel monitoring filters with flat-top drop-port responses are also desirable, that permit the extraction of only a fraction of the power in a particular wavelength channel without distortion of the extracted or remaining signals. Dense integration of CADFs and other filters, as well as complete OADMs, on a chip is desirable from both a technological and an economic point of view.

State-of-the-art integrated CADFs employ waveguide-coupled resonators (for their frequency selectivity), and are implemented in dielectric materials for the low absorption losses these provide at optical frequencies. Multiple-cavity coherent filter configurations such as series-coupled microrings and parallel-coherent microrings are known in the art and commonly used to achieve higher-order, flat-top bandpass/band-stop filter responses that fully extract a selected wavelength channel, for add/drop filter applications. In a series-coupled arrangement, each resonator is mutually coupled and for at least an output port (e.g. the drop port) an input signal that is outputted from the output port passes sequentially through each resonator For an idealized resonator system with lossless resonant cavities, couplings and waveguide propagation, models of these filter topologies permit design of the input-to-drop response function for maximally flat (Butterworth), equiripple (Chebyshev), etc. passbands in analogy to electronic filters. The resulting designs generally require synchronous cavities and symmetric coupling-coefficient distributions. In the absence of loss and reflection, the other three relevant amplitude response functions of the add-drop filter (i.e. input-to-thru, add-to-thru and add-to-drop) are fixed by power conservation and geometric symmetry.

In practice, the resonant cavities, their mutual couplings and waveguide propagation have finite losses due to radiation and absorption. Loss in cavities tends to degrade the CADF response by reducing the channel drop efficiency from 100%, rounding the flat-top drop-port passband, reducing the out-of-band rejection, degrading in-band rejection in the thru port and increasing by-pass losses seen by adjacent channels. Thus, considerable research effort has been invested to design and fabricate lower loss cavities to reduce the degradation due to loss.

SUMMARY OF THE INVENTION

The concerned invention describes filters with asymmetric coupling distributions and provides a means for obtaining: flat-top responses in presence of substantial cavity losses; low-loss flat-top-response wavelength-dependent optical tap filters with <100% dropped power; and multi-stage arrangements that permit the engineering of all (drop, thru, add) responses to prescribed spectral specifications for filters that have substantial cavity losses.

According to one aspect of the invention, there is provided an optical filter. The optical filter includes at least one waveguide structure and a plurality of series-coupled optical resonators that are aligned in a coupled arrangement with the at least one waveguide structure so as to produce an asymmetric distribution of coupling coefficients.

According to another aspect of the invention, there is provided a multi-stage optical filter. The multi-stage filter comprises an incoherent cascade arrangement of at least two individual filter stages, wherein at least one of the stages includes at least one waveguide structure and a plurality of series-coupled optical resonators that are aligned in an asymmetric coupled arrangement.

According to another aspect of the invention, there is provided a wavelength-selective signal splitter, comprising an optical filter which includes at least one waveguide structure and a plurality of series-coupled optical resonators that are aligned in a coupled arrangement with the at least one waveguide structure so as to produce an asymmetric distribution of coupling coefficients.

According to another aspect of the invention, there is provided a method of forming an optical filter. The method includes providing at least one optical waveguide structure, series-coupling a plurality of optical resonators so as to define a plurality of coupling coefficients and coupling to said at least one optical waveguide structure said plurality of series-coupled optical resonators so as to define a first coupling coefficient, so that said first coupling coefficient and said plurality of coupling coefficients produce an asymmetric distribution of coupling coefficients.

According to one aspect of the invention, there is provided an optical filter. The optical filter includes at least one waveguide structure and a plurality of optical resonators that are aligned in a coupled arrangement with the at least one waveguide structure so as to produce an asymmetric distribution of coupling coefficients.

According to another aspect of the invention, there is provided a method of forming an optical filter. The method includes providing at least one waveguide structure. The method also includes aligning a plurality of optical resonators aligned in a coupled arrangement with the at least one waveguide structure so as to produce an asymmetric distribution of coupling coefficients.

According to another aspect of the invention, there is provided a The optical filter includes at least one waveguide structure and a plurality of optical microring resonators that are aligned in a coupled arrangement with the at least one waveguide structure so as to produce an asymmetric distribution of coupling coefficients.

BRIEF DESCRIPTION OF THE DRAWINGS

FIGS. 3A-3B are graphs demonstrating degradation of the response, due to resonator loss, of a filter that employs a conventional, symmetric-coupling design based on the assumption of lossless resonators;

DETAILED DESCRIPTION OF THE INVENTION

Figure 1A:
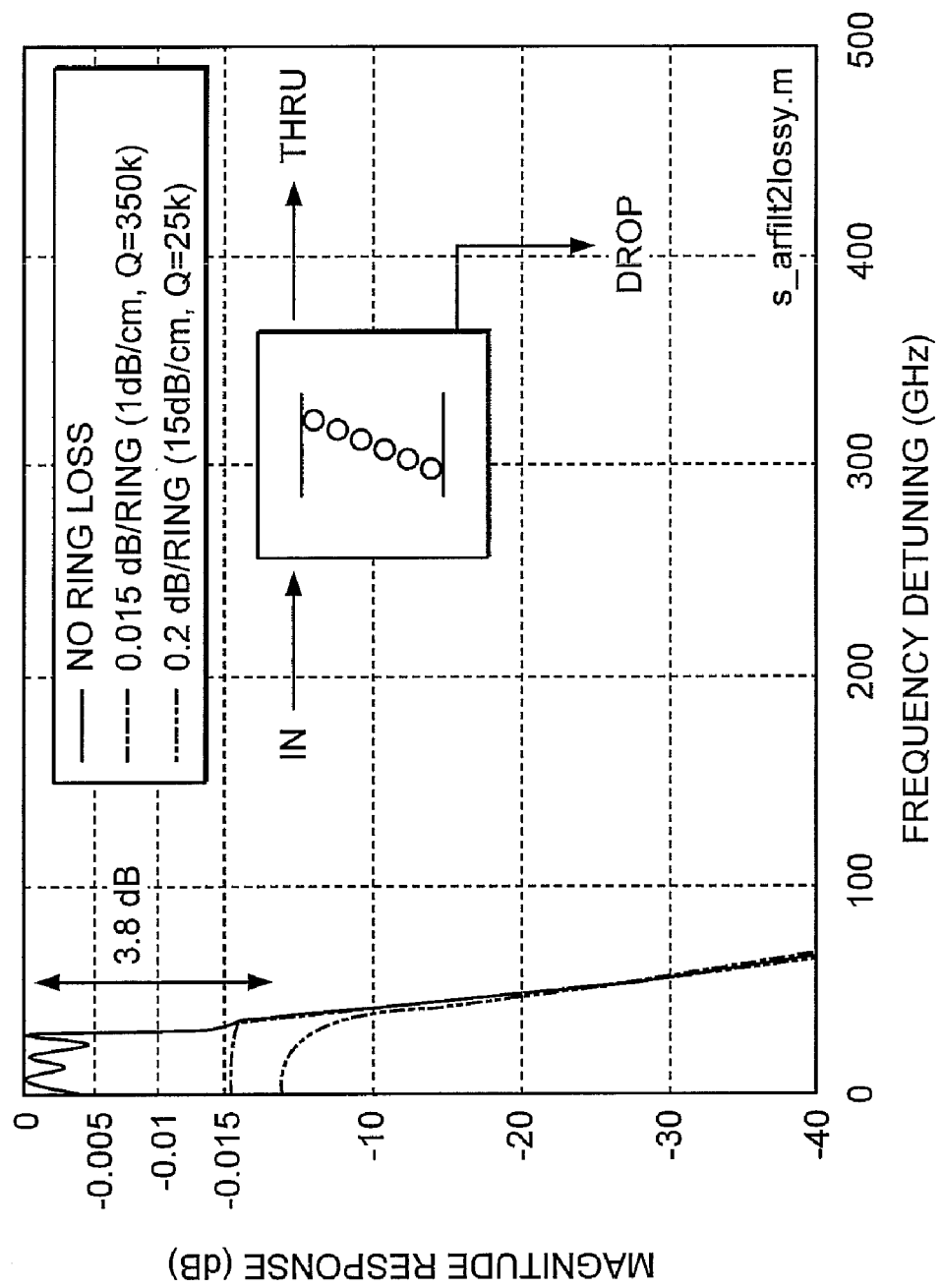
FIGS. 1A-1D illustrate filter response graphs for a single-stage 6-th order filter required to satisfy 30 dB out-of-band and in-band rejection respectively in the drop and thru ports, with a 60 GHz passband and 40 GHz transition band on either side (prior art)

The invention involves a technique of design for prescribed spectral characteristics and means of realization of optical coupled-resonator wavelength (channel add/drop) filters in which: the resonators have finite loss; or low-loss filters with non-unity dropping efficiency are desired. For optimal bandpass designs (e.g. maximally flat (Butterworth), equiripple (Chebyshev), etc), the Applicant has investigated an asymmetric distribution of coupling coefficients, and thus generally an asymmetric filter geometry. Unlike the lossless case, due to absence of power conservation, an optimal lossy drop port design does not also yield an optimal thru-port rejection response shape; different designs are needed for optimal drop-port filtering and thru-port rejection. A specific design yields the minimum drop loss. The design procedure also enables the design of low-loss, flat-top wavelength tap (optical channel monitor) type filters as well as low-loss asymmetric flat-top channel add/drop filters. For a complete add-drop, a cascade of several filter stages, each stage comprising a coupled-resonator filter, can be used to meet spectral design criteria in all ports, even when the resonators are lossy.

Dielectric resonators of finite size relying on index confinement suffer from fundamental radiation loss, leading to CADFs with finite insertion loss. The loss of a resonator is quantified by its quality factor Q which measures the resonator's ability to retain resonant energy. The Q-factor is defined as the energy stored times the angular frequency divided by the power loss to various loss mechanisms (high Q=low loss). In microrings, the loss is due to waveguide bending radiation loss and increases for a smaller radius, i.e. a larger free spectral range (FSR). In practice, additional challenges include loss due to waveguide surface roughness and material absorption, which contribute to lower resonator Q's, and performance degradation due to fabrication errors.

The goal is to design CADFs which meet frequency selectivity design criteria (passband/stopband ripple/rejection in all ports) that include a prescribed margin of fabrication error tolerability and minimize insertion loss. Accordingly, design must take into account loss sources and fabrication tolerances.

Though the invention applies to other types of resonators which can be arranged in a series-coupled arrangement, the examples are given in terms of coupled microring-resonator filters. Coupled resonator filters produce filter responses based on the disposition of the resonance frequencies and mutual couplings of the resonators and their coupling to bus waveguides. In microring filters, the resonance frequencies are determined by the size, shape and material indices of the ring design, while the couplings between adjacent rings, or rings and waveguides, are realized through evanescent coupling across gap spacings designed to yield desired coupling coefficients.

In conventional series-coupled ring CADFs, optimal designs are those of minimum order, i.e., minimum number of coupled resonators, in order to minimize insertion loss. If used as channel add/drop filters, such designs suffer from excessive near-resonance losses because they must satisfy the in-to-drop and in-to-thru response specifications simultaneously. Due to large out-of-band and in-band rejection (about 30 dB) generally required for the in-to-drop and in-to-thru responses, respectively, the design calls for a higher order filter than would be sufficient to satisfy either specification individually. In addition, these designs suffer from strong sensitivity to fabrication errors in the thru-port response. The thru rejection may be limited by the error tolerances such that it may not be possible to improve it by increasing filter order. Thus, the Applicant has further identified the problem of meeting thru response rejection criteria subject to a non-zero resonator loss and statistical error in the filter parameters.

An example is given to illustrate the drawbacks of this conventional (prior art) design. Consider a 10-channel WDM spectrum with 60 GHz-wide channels at 100 GHz spacing. Assume a specification for in-to-drop, in-to-thru, add-to-drop and add-to-thru response functions of 0.5 dB ripple in the passband, 30 dB rejection in the stopband (i.e.

after a 40 GHz transition band to the edge of the adjacent channel), a required tolerability of ±6% error in coupling coefficients and minimum possible insertion loss given the geometry and material system. For this example, waveguides of effective index 1.7 and group index 2.2 were used and the ring radius was chosen for an FSR of 1 THz (10 ch×100 GHz spacing).

A $6^{th}$-order Chebyshev-type series-coupled-microring lossless filter is required to satisfy all of the requirements. The limiting specification is the rejection in each port of 30 dB, which by power conservation implies a passband ripple in the complementary response of about 0.005 dB, much more strict than required.

Figure 1B:
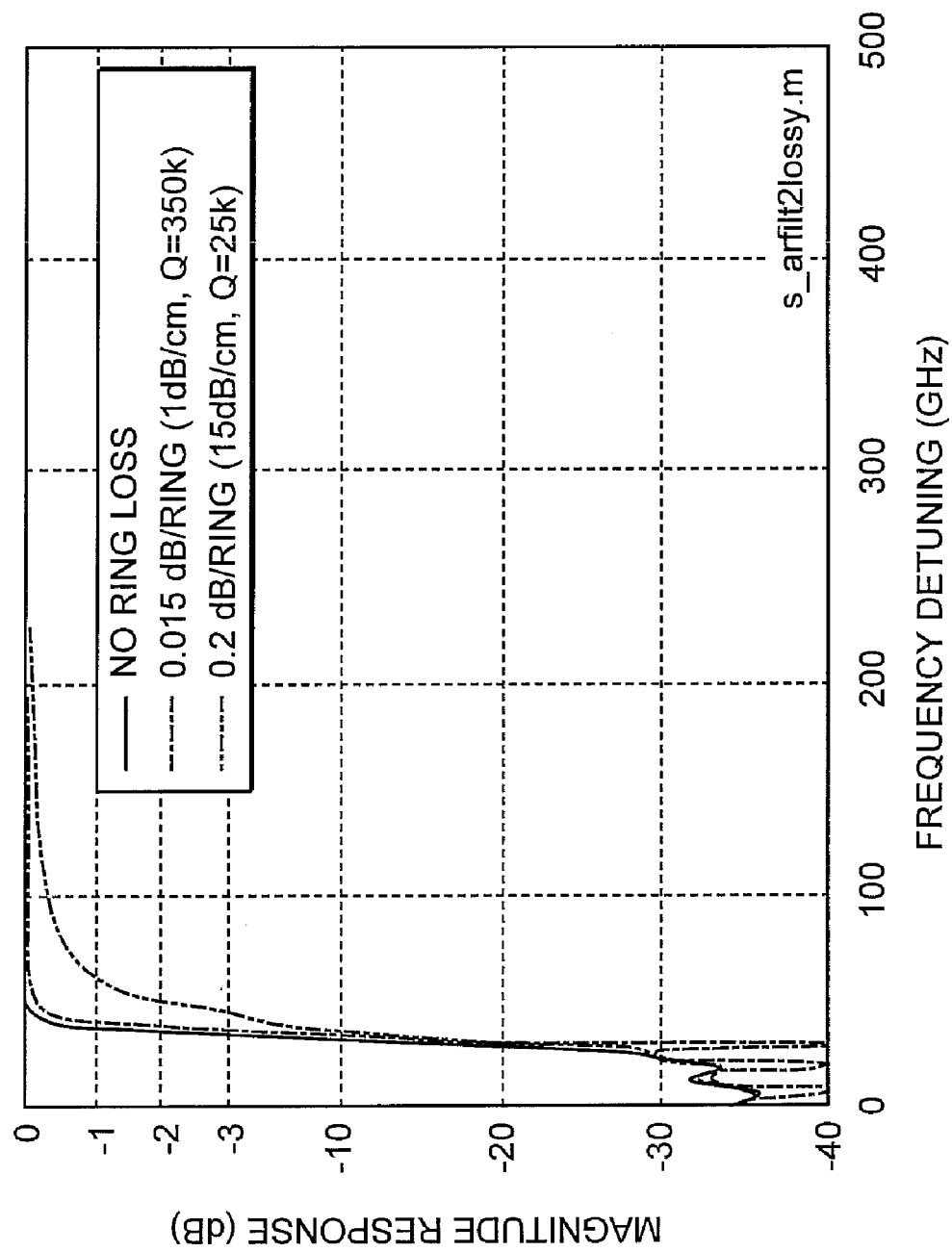

FIG. 1A and FIG. 1B show the in-drop and in-thru response functions, respectively. Responses for various finite resonator Q's show an insertion loss near resonance, a rounding of the drop passband response and little change in the thru rejection for reasonably low losses. For realistic ring Q's of 25,000, the CADF sees a significant insertion loss of about 4 dB in the drop response, as shown in FIG. 1A. On the other hand, a filter required only to meet the drop response requirements would require only 4 rings (fourth order) and would give a lower insertion loss of about 3 dB.

Figure 1C:
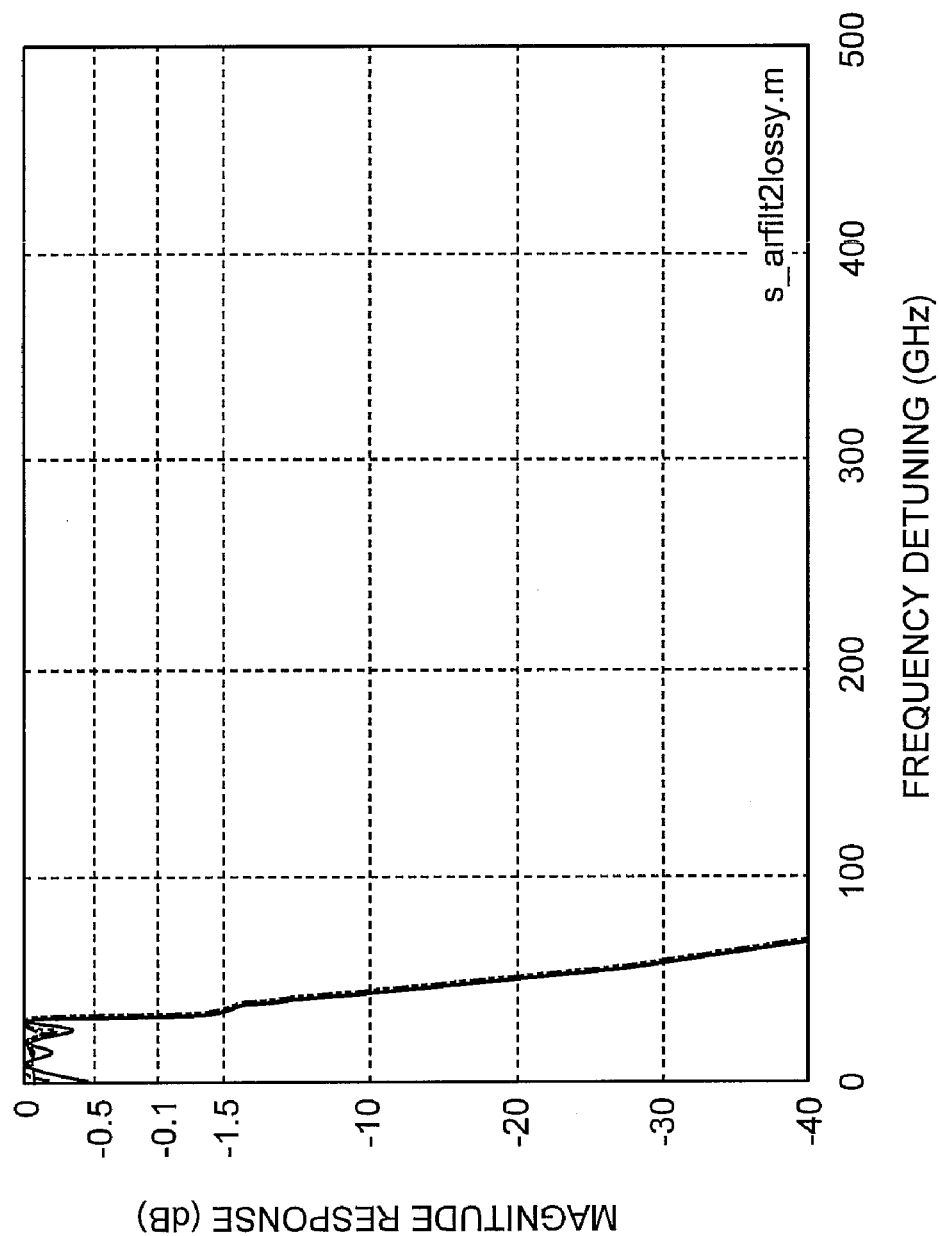
Figure 1D:
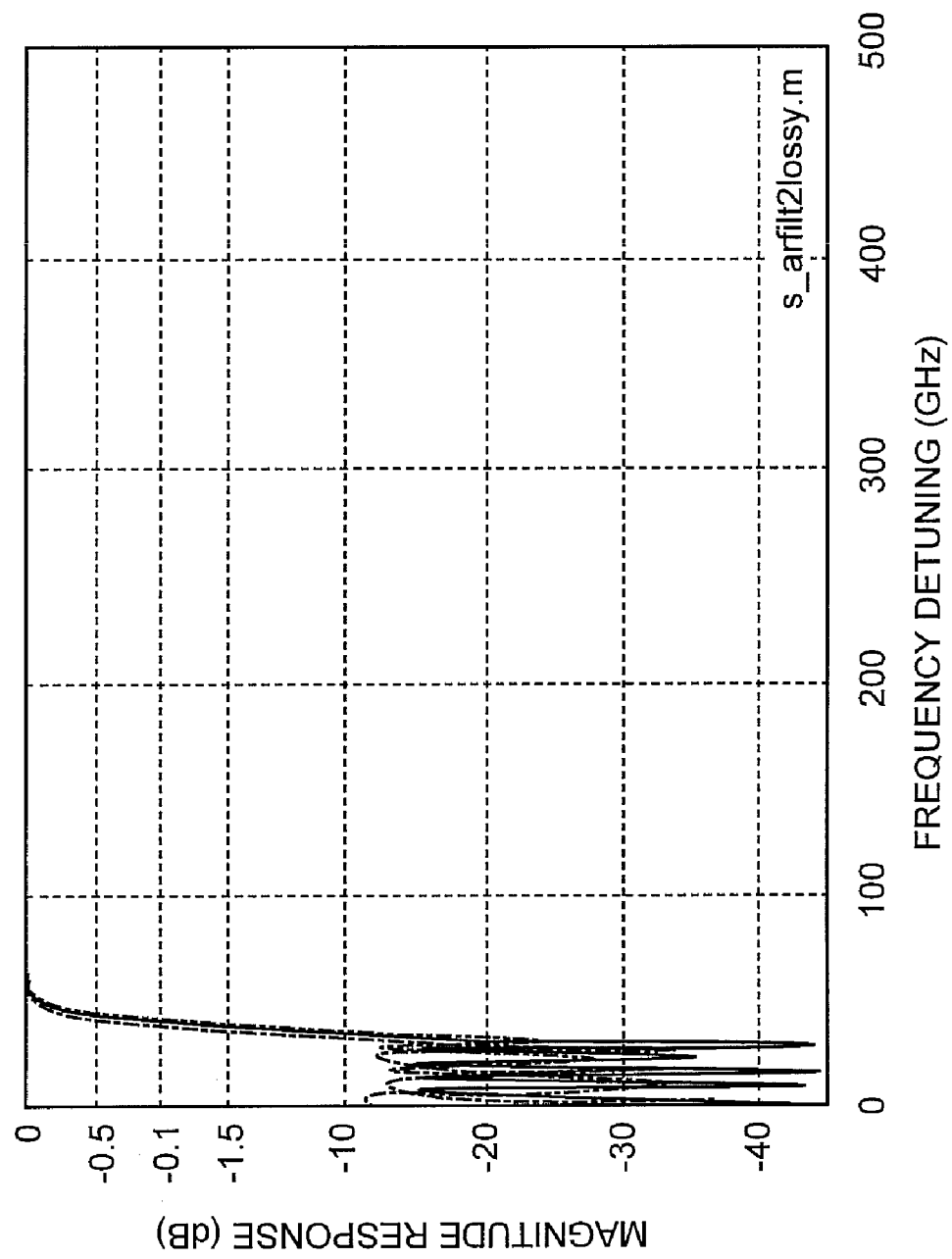

An assessment of fabrication (or modeling) error tolerability in the coupling coefficients was done by allowing the waveguide-ring and ring-ring coupling coefficients to vary statistically with a uniform distribution between ±6% of their value. A set of 100 sample filters from this distribution is overlaid in FIGS. 1C and 1D. The thru response function is severely affected, reducing the rejection from 30 dB to 10 dB. The error distribution is the dominant factor determining the rejection and increasing the order of the filter (or the design rejection) is not of benefit.

Microring filters are realized by lithography on a chip in dielectric materials of arbitrary index contrast. High index contrast (of the order of 8% to 50–200% and greater) is of advantage for microrings to achieve usable free spectral range (FSR) while maintaining acceptable radiation loss. Nevertheless, the design technique of the invention applies to all index contrasts.

Optical resonators rely on index confinement and as such possess fundamental radiation loss. To achieve small ring radius and a large FSR for a large operating spectrum, high index contrast is used in order to keep radiation loss within acceptable bounds. Resonators made of high index contrast waveguides, however, may suffer from scattering loss due to sidewall roughness and, when coupled to other resonators and waveguides, also scattering loss in coupler regions where coupling gaps are small. Other possible sources of loss include material absorption and other scattering defects in/on the ring or in its proximity. In practice, some amount of loss is present in all optical resonators, though it may be small.

In the case of lossless resonators, optical filter designs derived from standard electronic filter designs for optimal responses (e.g. maximally flat—Butterworth, equiripple—Chebyshev, etc.) lead to a symmetric distribution of coupling coefficients among resonators, and between resonators and the bus waveguides. Coupling coefficients are a general measure of coupling between arbitrary types of resonators, introduced further in the description below. In the literature, they are also referred to as energy coupling coefficients. In traveling-wave resonators such as microrings, they can be translated to a more intuitive set of power coupling coefficients which describe the fraction of optical power coupled from one waveguide or ring to another, in one pass. For the case of identical FSRs in all microrings, a symmetric distribution of (energy) coupling coefficients translates to a symmetric distribution of power coupling coefficients, and likewise normally a symmetric distribution of coupling gap spacings, as illustrated in FIG. 2A.

Currently, such lossless designs (designs that assume no loss in resonators) for optical channel add/drop filters appear to be standard practice. Resonator losses then tend to degrade the filter response. Additional loss and gain has been applied in literature to resonators to correct for fabrication errors in such designs (post-fabrication). In the present invention, the loss of the resonators is dealt with in the design of an optical filter by manipulating the coupling coefficient distribution. In electronic filter design, predistortion is a known perturbative technique for correcting the filter shape distortion due to loss, but electronic filters normally aim to satisfy specifications for only one response function. In the context of some optical filters (e.g. channel add/drop filters), one must satisfy design criteria for several response functions.

Figure 2A:
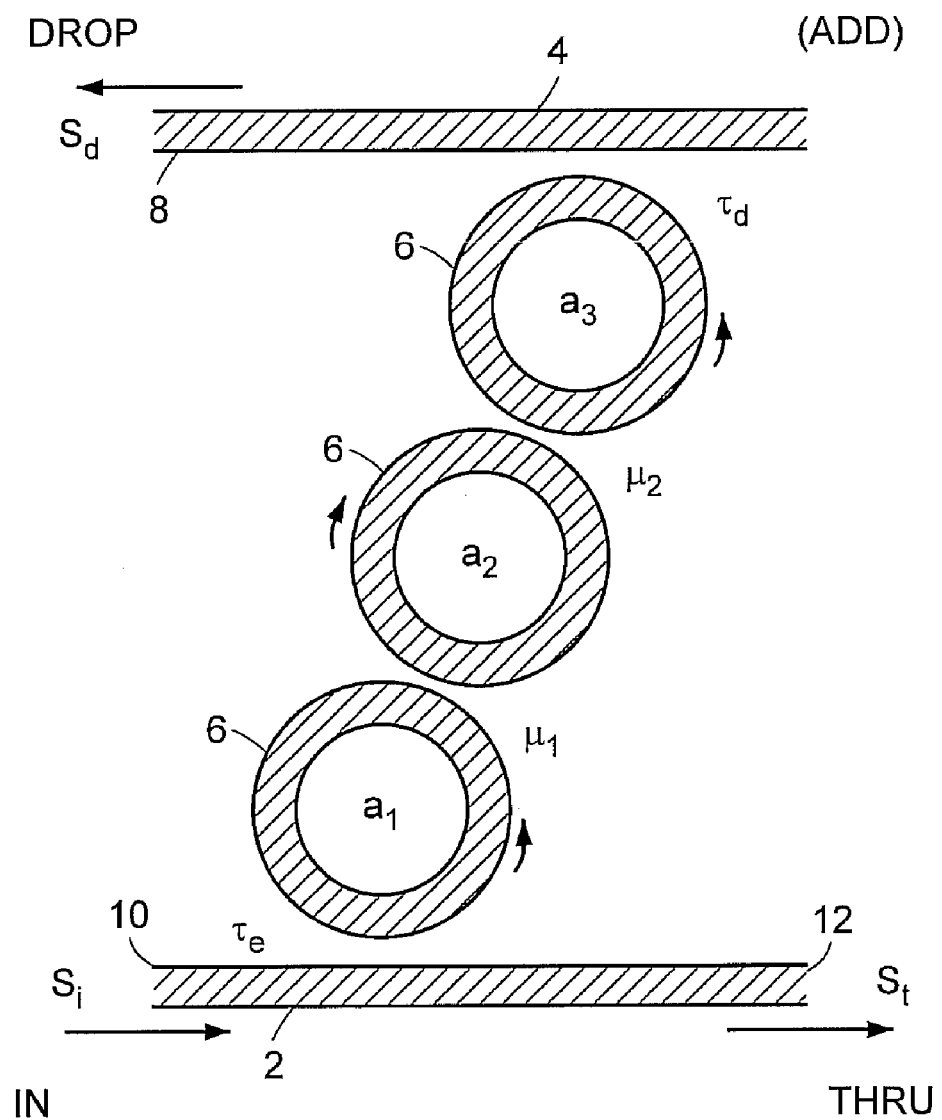
FIGS. 2A-2C are schematic diagrams demonstrating a microring waveguide realization of optical channel add-drop filters.

The standard lossless optical filter designs result in a symmetric distribution of coupling coefficients, leading to a symmetric filter geometry as exemplarily shown in FIG. 2A for a 3-rd order filter (N=3) using microrings as resonators. The coupling coefficient configuration is $\{\tau_e, |\mu_1|^2, |\mu_2|^2, \tau_d\}$ corresponding to the coupling between, respectively, in-thru waveguide 2 and most adjacent ring a1, ring a1 and ring a2, ring a2 and ring a3, ring a3 and most adjacent drop waveguide 4. Accordingly, $\tau_e = \tau_d$ and $|\mu_1|^2 = |\mu_2|^2$. Input optical signals are received by input port 10 coupled to waveguide 2.

Figure 3A:
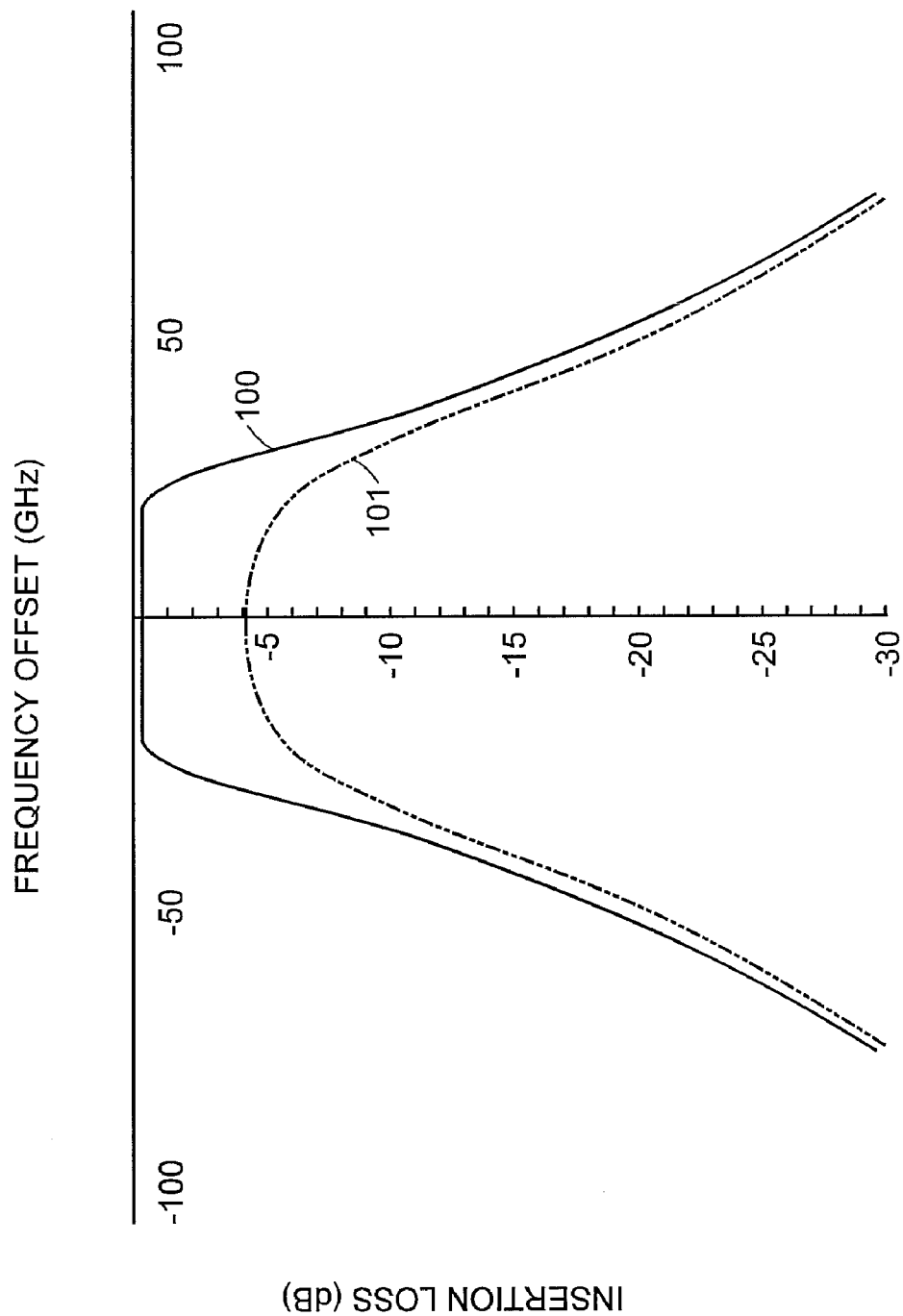

The presence of the loss in the resonators of a filter degrades the ideal drop port response 100, rounding the desired flat-top passband and reducing the out-of-band rejection in addition to bringing with it an inherent filter insertion loss as shown by curve 101 in FIG. 3A. The ideal thru-port rejection response 102 is also affected and degrades most near the stopband edges, accompanied by some additional insertion loss in the adjacent express channels as shown by curve 103 in FIG. 3B.

Designs based on lossless resonators are convenient, but flawed when applied to filters using finite-Q (lossy) optical resonators. In cases of high enough Q (low enough losses), they may be adequate but will be suboptimal; in cases of lower Q's, they do not give a practical way of meeting design criteria.

In the case of lossless resonators, these coupled-resonator filters lend themselves to standard electronic filter design for the bandpass in-to-drop response function. A mapping of the design parameters obtained from filter synthesis onto coupling coefficients is required. The coupling coefficient distribution is symmetric in these lossless filters for any order, and in the case of the 3-ring filter schematic in FIG. 2A it means ($\tau_e = \tau_d$, $|\mu_1|^2 = |\mu_2|^2$). For rings of identical FSRs, the power gaps in the filter realization of FIG. 2A. All resonant frequencies are identical in standard designs.

Figure 2B:
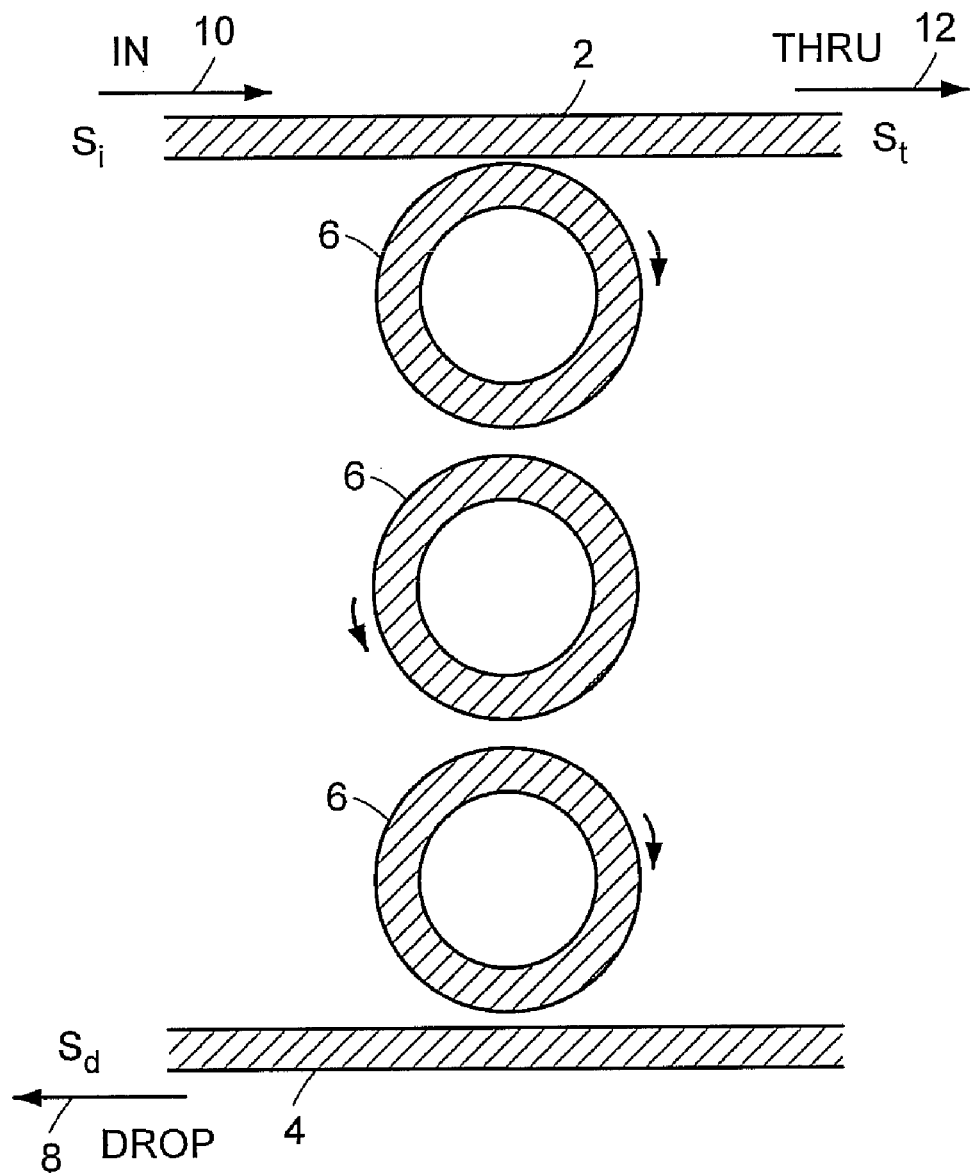
Figure 2C:
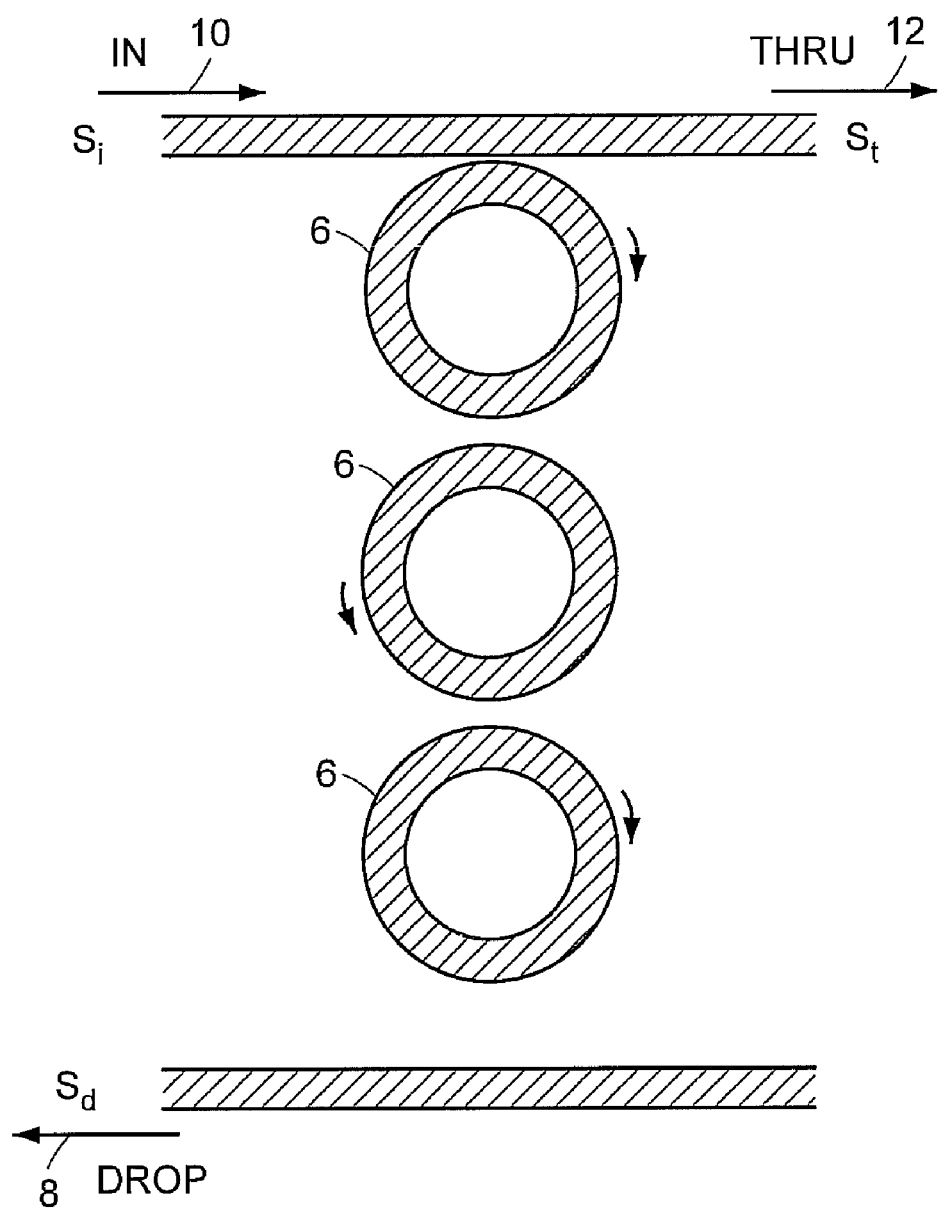

The invention develops new designs having asymmetric coupling coefficient distributions, as illustrated schematically in FIGS. 2B and 2C, which take full account of resonator loss, and are able to exactly restore the input-to-drop (port 10-to-port 8) bandpass response function shape to that of the ideal lossless prototype (within a constant insertion loss offset). It is shown that there is a family of designs that can restore the ideal response shape, but generally only up to two which also give minimum insertion loss performance. Two minimum-loss designs occur in filters with 3 and more rings when the distribution of resonator losses across the filter is symmetric (for example when losses of all resonators are equal). Of such two minimum-loss designs, one is shown to be optimal in the context of an add-drop filter. Alternatively, one may approximately restore the thru-port 12 bandstop response function instead. In the absence of power conservation, different lossy-filter designs are required for the drop 8 and thru port 12. One may cascade filter stages designed in this manner to fully satisfy a prescribed set of specifications for an add/drop filter. Of course, a flat insertion loss remains as a consequence of the finite loss of the resonators.

One may use the known solutions using coupled-mode theory in time (CMT) for the in-drop and in-thru response of a coupled resonator filter in terms of a continued fraction expansion. For an Nth order filter (N coupled resonators), the drop response is all-pole (no zeros) with N poles in the complex-frequency plane, while the thru response has N poles and N zeros. The drop and thru response functions share the same pole locations in the complex frequency plane, and the shape of the drop response is fully determined by the pole positions, except for a constant scale factor representative of insertion loss. The thru response has an equal number of poles and zeros such that in this model it is always unity far from resonance. The thru response, for example, of a 3-ring filter is, $$\frac{s_t}{s_i} = 1 - \cfrac{\frac{2}{\tau_e}}{j\Delta\omega_1 + \frac{1}{\tau_{o1}} + \frac{1}{\tau_e} + \cfrac{\mu_1^2}{j\Delta\omega_2 + \frac{1}{\tau_{o2}} + \cfrac{\mu_2^2}{j\Delta\omega_3 + \frac{1}{\tau_{o3}} + \frac{1}{\tau_d}}}} \quad (1)$$

with $\Delta\omega_n = \omega - \omega_n$. The drop port response, also known from literature, is more complicated but has the same polynomial denominator, and thus poles, as (1). Here, $\omega_n$ is the resonant frequency of each ring n, while $1/\tau_{on}$ is its loss rate (assumed zero in lossless designs), $\mu_n^2$ are the coupling coefficients between ring n and adjacent ring n+1, while $\tau_{e,d}$ are related to the couplings, respectively, between the ring a1 and the external input waveguide 2 and the ring a3 and the external drop waveguide 4 of FIG. 2A.

The filter response in this model is determined by the N resonant frequencies of the resonators and N+1 coupling coefficients (N−1 between adjacent resonators, and 1 to each of the bus and drop waveguides). The resonant frequencies can be different, and may be complex (if the explicitly shown loss rates $1/\tau_{on}$ are instead absorbed into the resonant frequency variable) where the imaginary parts represent the resonator losses.

The invention can use as a starting point a standard lossless optical bandpass prototype design (e.g. Butterworth or Chebyshev) that meets certain design criteria. This gives a starting point of N identical resonant frequencies and a symmetric distribution of N+1 coupling coefficients.

When designing a lossless add-drop filter, one must design for the more stringent of the drop and thru port specifications as discussed, and the other follows by power conservation. When loss is introduced into the resonators, power complementarity between the drop and thru port is lost and an optimized filter shape in one port does not guarantee the same in the other.

First a lossy filter design is considered for the drop port response. The drop response has no zeros and N poles. The design parameters are N resonant frequencies $\{\omega_1, \omega_2, \ldots \omega_N\}$ and N+1 coupling coefficients $\{1/\tau_e, \mu_1^2, \mu_2^2, \ldots \mu_{N-1}^2, 1/\tau_d\}$ (compare equation (1)). Defining a normalized complex frequency $s \equiv j(\omega - \omega_o)$, and given a central filter frequency of $\omega_o$, the drop response function takes the form $$\frac{s_d}{s_i} = A \prod_{n=1}^{N} \frac{1}{(s - s_n)} = \frac{A}{\sum_{n=0}^{N} a_n s^n} \quad (2)$$

where the first representation is in terms of the product of N poles, whose positions are complex numbers $s_n$, and a constant multiplier A, while the second shows the denominator expanded into a polynomial with N+1 coefficients, $a_0$ to $a_N$ (with leading coefficient $a_N = 1$). The poles, or the coefficients an, correspond to the denominator of the filter model in equation (1). These poles $s_n$ are desired to be kept in the same positions they occupied in the lossless optimal bandpass prototype design (e.g. Butterworth or Chebyshev), after resonator loss is introduced into the model. One can equivalently do this by trying to preserve the values of all of the N variable denominator coefficients $a_n$ ($a_N = 1$). To accomplish this, several adjustable parameters are introduced. If the resonators are allowed to have different frequencies, there will be remaining frequency offset terms $\delta\omega_n$ added to $\omega_o$ for resonator n. Furthermore, an adjustable offset is introduced for each of the coupling coefficients (refer to FIG. 2A), with the same name but preceded by "$\Delta$" (note that these correction terms $\{\Delta(1/\tau_e), \Delta\mu_1^2, \Delta\mu_2^2, \ldots \Delta\mu_{N-1}^2, \Delta(1/\tau_d)\}$ are N+1 independent new variables used in the design procedure, not to be confused with the starting point coupling coefficients $\{1/\tau_e, \mu_1^2, \mu_2^2, \ldots \mu_{N-1}^2, 1/\tau_d\}$). In the case of the thru response, the response would now look as follows, $$\frac{s_t}{s_i} = 1 - \cfrac{\frac{2}{\tau_e}}{s - j\delta\omega_1 + \frac{1}{\tau_{o1}} + \frac{1}{\tau_e} + \Delta\frac{1}{\tau_e} + \cfrac{\mu_1^2 + \Delta\mu_1^2}{s - j\delta\omega_2 + \frac{1}{\tau_{o2}} + \cfrac{\mu_2^2 + \Delta\mu_2^2}{s - j\delta\omega_3 + \frac{1}{\tau_{o3}} + \frac{1}{\tau_d} + \Delta\frac{1}{\tau_d}}}} \quad (3)$$

The drop port response has the same denominator as (3), and thus the same poles, which determine its response shape. Consideration of resonator losses in (1) degrades the lossless filter design response shape by moving the pole positions. To obtain the desired response in the presence of loss by recovering the pole positions, it is important to make equal the denominator of the ideal lossless drop response, used as the starting point, and the denominator of the above equation (3) (which is the same as the denominator of the drop) that includes loss and correction coefficients. The hope is that the offset coupling coefficients can be adjusted to counter the effect of the loss terms to restore the filter shape. Restoring the filter shape is important as its design is dictated by the choice of passband ripple, stopband rejection, etc. There are N+(N+1) variables (N resonator frequency corrections and N+1 coupling corrections), and 2N equations (since coefficient $a_N$ of $s^N$ is taken as 1, and there is an equation to satisfy for the real and imaginary parts of all N other coefficients $a_n$). However, lossless filter designs result in real coupling coefficients, so that in the lossless case the denominator coefficients $a_n$ are real. Thus, in the example designs, the resonator frequency offsets are set to zero because they generate imaginary terms.

Now with N+1 coupling coefficient offsets and N equations for the real $a_n$'s, one can solve the problem with one degree of freedom remaining, but the resulting coefficients are not always physically realizable (real). In the case of low enough loss, however, a physical solution can be found for a range of choices of the remaining degree of freedom. This means that one may set one degree of freedom (any one of the N+1 coupling coefficient corrections) arbitrarily, and the procedure will always determine the other N coefficients such that the filter shape is preserved, resulting in an infinite number of solutions. For resonator losses below a certain threshold, a range of choices results in physically realizable designs. However, given fixed resonator losses, the insertion loss of the filter will not be the same for all choices of the remaining degree of freedom. While one such choice may result in a symmetric distribution of coupling coefficients, in general it is a specific choice that results in an asymmetric distribution that yields the minimum insertion loss design for given resonator losses. This last degree of freedom is equivalent to an impedance matching.

Although the procedure accepts general resonator loss distributions across the filter, in our example designs we assume that the resonators have identical losses, which in practice is often the case. In this case, for filters with more than 2 rings the minimum loss design is generally still asymmetric, and further there are in fact two solutions for the minimum insertion loss. They are one set of coupling coefficients $\{1/\tau_e, \mu_1^2, \mu_2^2, \ldots \mu_{N-1}^2, 1/\tau_d\}$, and that same set in reverse order. While the drop response of these two designs is the same, the thru response is not. Only one of these two choices gives a better thru-port rejection response for a chosen input port, generally the one with the stronger input coupling.

The resulting new design, in the exemplary case of a $3^{rd}$ order microring filter, is schematically shown in FIG. 2B with an asymmetric coupling gap distribution. It is oriented such that the in-to-thru response has better rejection than the add-to-drop response.

While equations (1) and (3) are exemplarily given for a $3^{rd}$-order filter, the same procedure applies for any order. Accordingly, a filter with resonator losses $(\tau_{o1}, \ldots \tau_{on})$ is assigned exact corrections $(\Delta 1/\tau_e, \Delta\mu_1^2, \ldots \Delta\mu_N^2, \Delta 1/\tau_d)$ with respect to the coupling coefficients of a chosen starting point filter—such as a conventional lossless prototype filter with symmetric couplings—to restore the drop response shape to the original (lossless) shape, with the exception of a finite insertion loss. The resonator losses can in general all be different. The freedom is provided to choose one of the coefficients in $(\Delta 1/\tau_e, \Delta\mu_1^2, \ldots \Delta\mu_N^2, \Delta 1/\tau_d)$ freely, and determine all others. So long as the corrections result in real (physical) coupling coefficients, the solution is realizable as a filter.

In the following, an example of design of a 3-rd order lossy filter comprising microring resonators optimized for input-to-drop functionality is given according to the above described method. Consider a filter with a desired bandwidth of 40 GHz, a channel spacing of 100 GHz implying a stopband beginning at 100-40/2=80 GHz from the center frequency, and a free spectral range (FSR) of 3 THz, supporting 30 WDM channels. The filter is centered at 1550 nm. The filter specs to meet are specified for both ports: in the drop port, a passband ripple 0.5 dB and a stopband (out-of-band) rejection of 30 dB at the next channel; in the thru port an in-band rejection of 16 dB. To achieve 30 dB in-band rejection in the thru-port this type of filter will require two cascaded stages in the thru port as described further below. In a lossless filter, a rejection of 16 dB in the thru port passband implies a drop port passband ripple of about 0.1 dB which is more restrictive. A 0.1 dB-ripple, 30 dB out-of-band rejection lossless drop filter can be designed according to known filter design techniques. This requirement can be met by a $3^{rd}$-order Chebyshev-type filter.

In filters using microrings and other traveling-wave resonators, an intuitive view of the couplings is given by power coupling coefficients $\{\kappa_1^2, \kappa_2^2, \ldots, \kappa_{N+1}^2\}$ which represent the fraction of guided light power coupled in one pass across each of the N+1 coupling regions starting from the input. They are obtained from the (energy) coupling coefficients used in our design procedure (which applies to all types of resonators) by a scaling by the FSRs of the traveling-wave resonators using the known relations: $\kappa_1^2 FSR_1 = 2/\tau_e$, $\kappa_i^2 FSR_{i-1} FSR_i = \mu_{i-1}^2$ for i=2 to N, and $\kappa_{N+1}^2 FSR_N = 2/\tau_d$, where $FSR_i$ represents the FSR of the i-th resonator. Subsequently a second mapping, also known in the art, is applied to account for a finite FSR and applies a minor correction for high finesse filters: $\kappa_i \rightarrow \kappa_i/(1+\kappa_i^2/4)$. The power coupling coefficients of the lossless filter described above are: {8.18%, 0.163%, 0.163%, 8.18%}.

FIGS. 3A-3B show, respectively, the in-drop and in-thru spectral responses of the lossless design about the center frequency (curves 100 and 102, respectively). In FIGS. 3A-3B, the horizontal axis is frequency offset from resonance (GHz), and the vertical axis is insertion loss (dB). When the resonators take on a finite loss Q, a degradation of the responses takes place, as exemplarily shown by curve 101 in FIG. 3A and curve 103 in FIG. 3B. An exemplary Q of 15000 has been chosen. This is a realistic loss Q due to radiation loss and coupler scattering for a microring resonator with an FSR of 3 THz (radius of about 7 microns) of cross-sectional waveguide dimensions 1.05 µm×0.33 µm with 2.2 core index, placed on a silica cladding of 1.445 index and top and side clad by air (1.0 index). A high loss can be intentionally used to illustrate the ability of new designs to restore the ideal response.

Clearly, resonator loss introduces drop insertion loss, but it also reduces the out-of-band rejection from about 31 dB to about 27 dB, and increases the passband ripple from 0.1 dB to about 1.5 dB. This violates the specification to achieve 30 dB rejection, and 0.5 dB passband ripple in the drop. The thru response also degrades, primarily near the band edges where the in-band rejection is reduced from about 16 dB to about 13 dB. In addition, some insertion loss is introduced in the adjacent express channels.

Figure 4A:
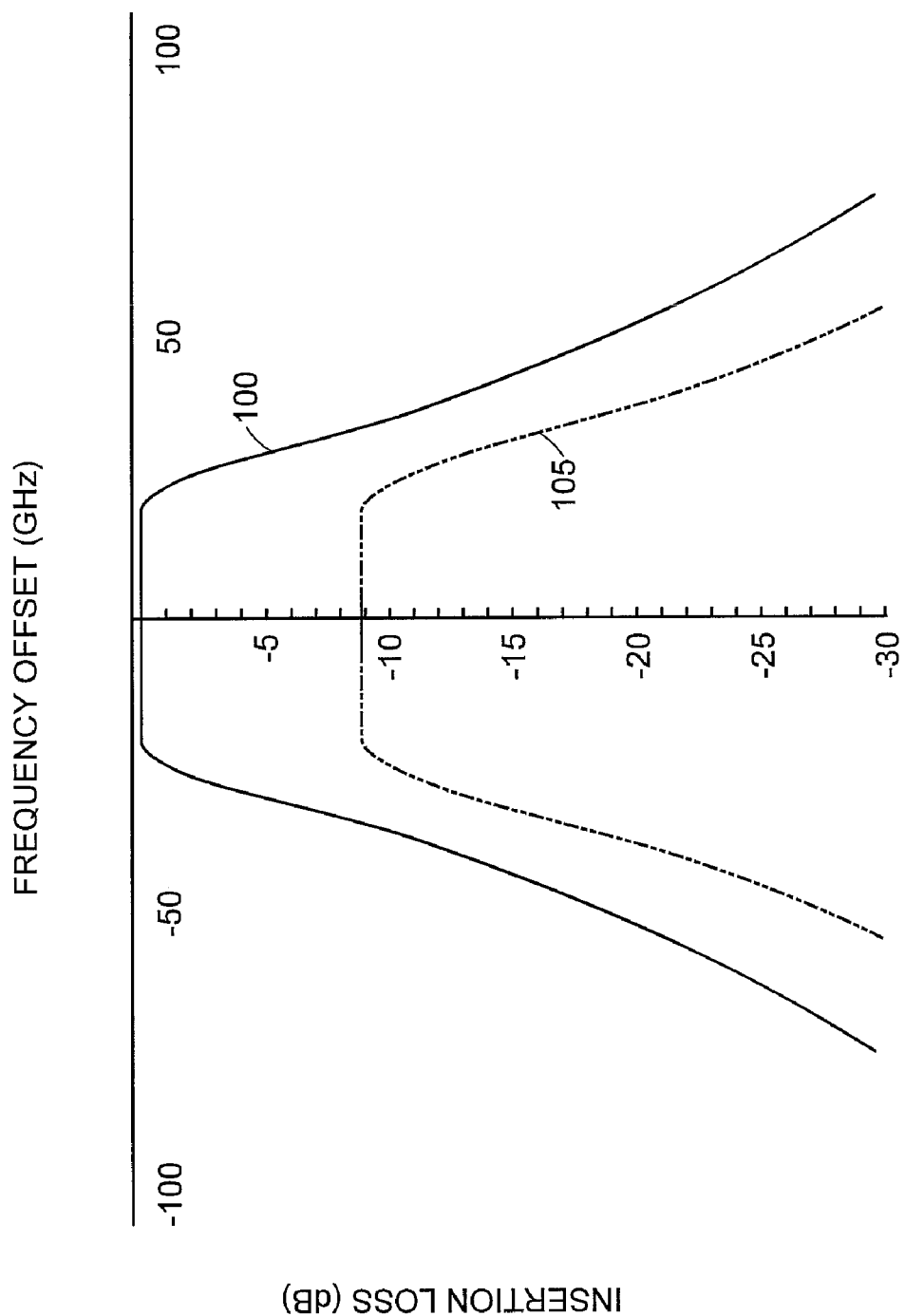
FIGS. 4A-4B are graphs demonstrating an asymmetric lossy filter design for optimal drop port and minimum insertion loss according to the present invention.
Figure 4B:
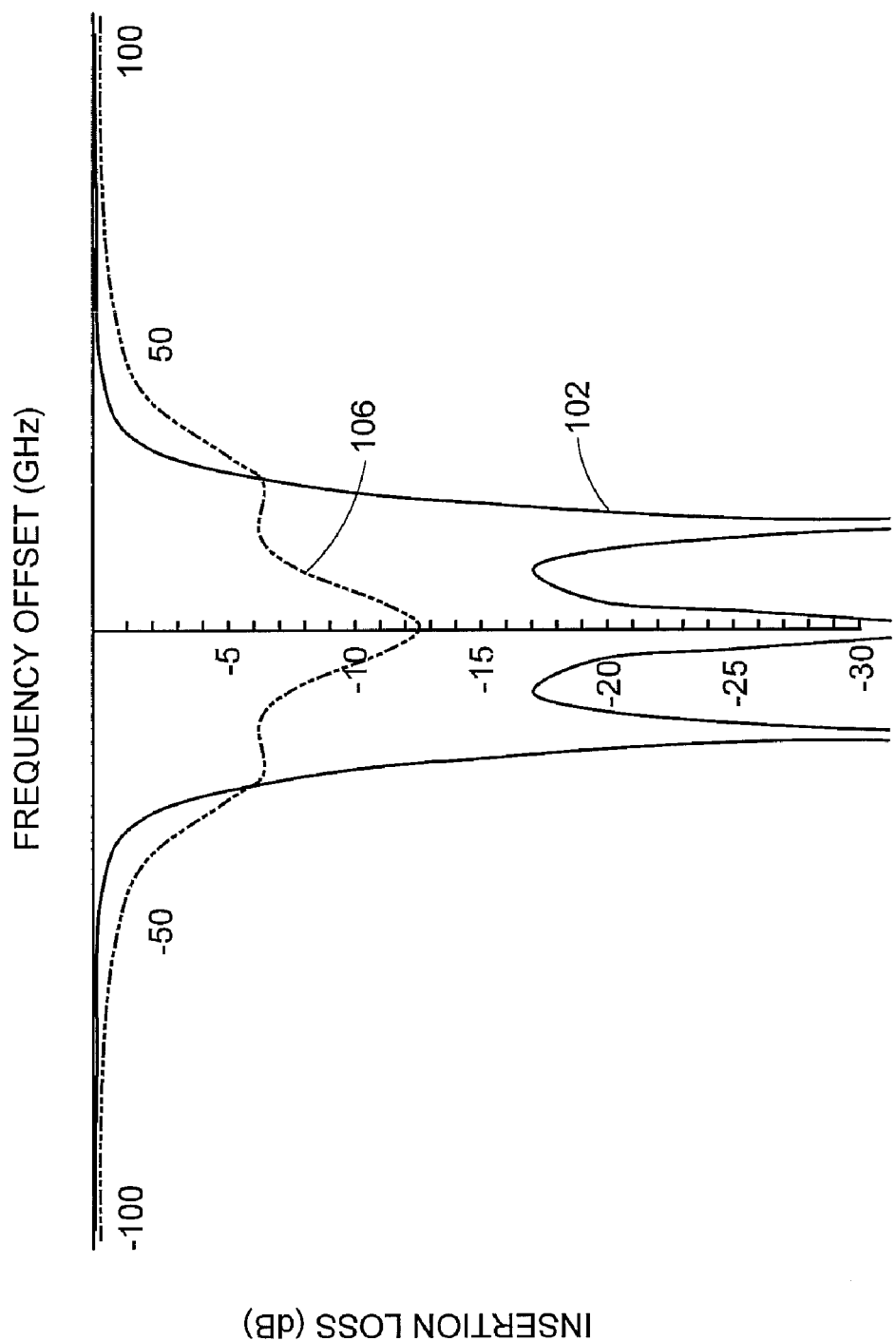

By applying the above described procedure to restore the lossless prototype filter shape which fulfills the desired specifications, it is possible to find the exact corrections to coupling coefficients $(\Delta 1/\tau_e, \Delta\mu_1^2, \Delta\mu_2^2, \Delta 1/\tau_d)$, choosing in particular the design that yields minimum insertion loss as described. The corresponding asymmetric power coupling coefficients are: {6.79%, 0.0840%, 0.215%, 1.90%}. FIGS. 4A-4B show the corresponding in-drop (curve 105) and in-thru (curve 106) spectral response, respectively. The drop port spectral response has been restored exactly to its optimal shape, as shown in FIG. 4A. An insertion loss of 9 dB is the price paid for realization using lossy resonators in this case. All of the drop port spectral specifications however are met, since the shape is identical. The increase of the insertion loss with respect to the 4 dB insertion loss of the original filter (lossless, symmetrical design, with ring losses introduced) of FIG. 3A is not meaningful, because the original filter does not meet the spectral specifications. If a passband ripple of 1.5 dB is desired, then a lossless filter of such specifications could be designed and translated to a design with loss using the method provided herein. The advantage of the present design approach is that loss is explicitly taken into account in the design, rather than ignored and subsequently added in.

The thru port response of this drop-optimized filter, as shown in FIG. 4B, is significantly degraded due to the design of the drop response for loss, in comparison to the lossless design in FIG. 3B with (or without) loss. The rejection is reduced from 13 dB (16 dB) to a mere 6 dB. Clearly, while an optimal design is shown for the drop response of a lossy filter, this design is not also optimal for the thru port. The unaltered lossless design, in fact, has a better in-band rejection in the thru port.

Figure 5:
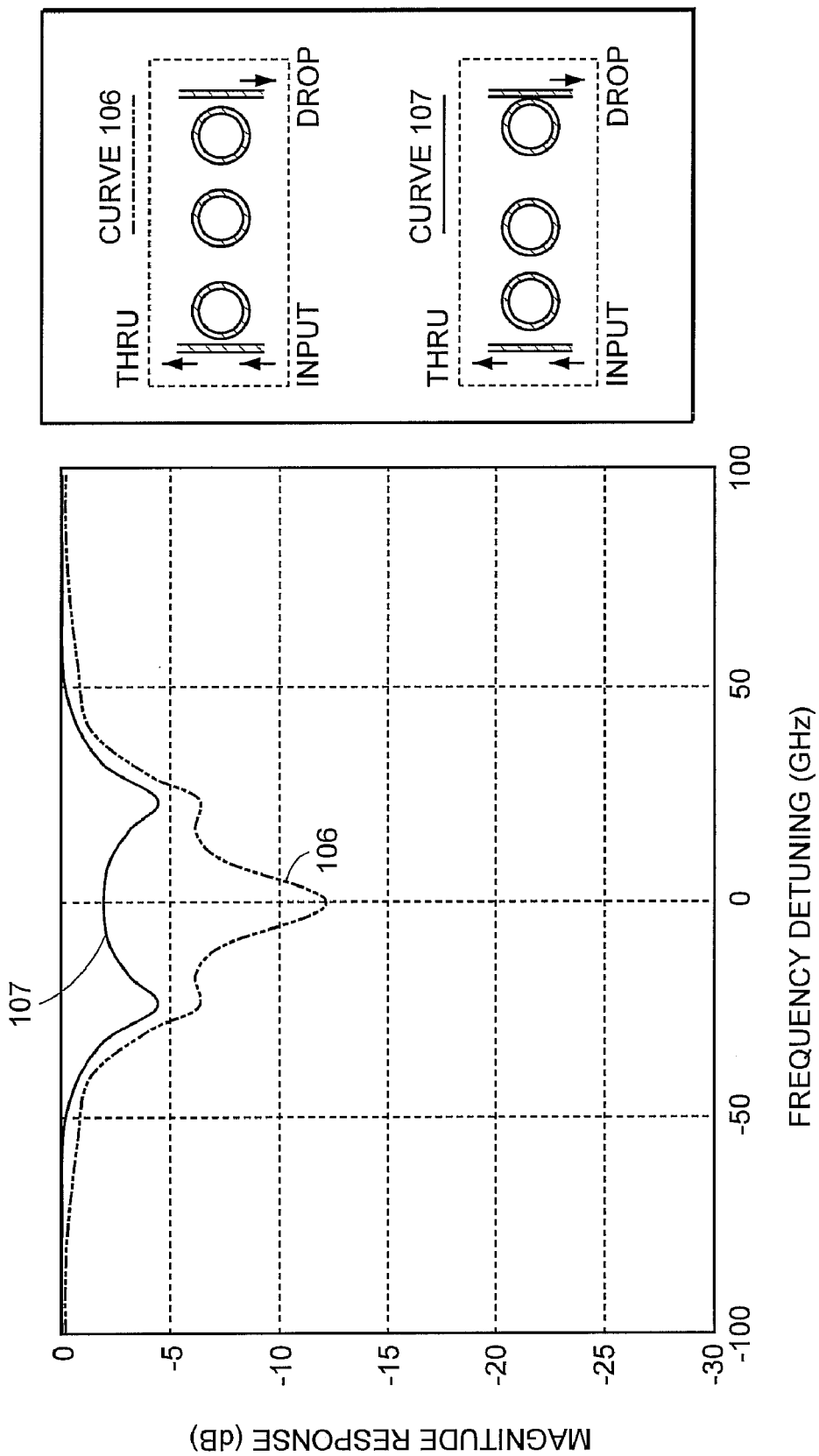
FIG. 5 is a graph demonstrating a comparison of thru-port responses of two asymmetric filter designs with optimal drop port performance and minimum insertion loss.

In FIGS. 4A-4B, the spectral responses of the minimum-insertion-loss drop-optimized lossy design with the thru-port response that has more in-band rejection are shown. For comparison, this thru-port response (curve 106) and the in-thru spectral response (curve 107) of the other minimum-insertion-loss design (with symmetrically reversed coupling coefficients) are shown in FIG. 5. The drop response corresponding to thru response 107 is the same as curve 105 in FIG. 4A. Clearly, the thru response (curve 106) of FIG. 4B is superior to that of FIG. 5 (curve 107) in terms of in-band rejection, though either alone is insufficient to meet preferred requirements of 30 dB rejection for add/drop filter applications (addressed later). This is why it is preferable to employ the design corresponding to FIGS. 4A-4B as part of an add-drop filter.

In another aspect of the invention, the above procedure for drop response engineering—using the extra degree of freedom which controls impedance matching/insertion loss—has an advantageous application for the design of flat-top bandpass channel monitors, even in the absence of significant resonator losses. Even with no losses to require compensation of the response shape, the above procedure may still be used to change the input coupling (such as for example $1/\tau_e$ in FIG. 2A), and find the remaining coupling coefficients such that the drop response shape is unchanged in shape, but has by design <100% dropped power. Because all couplings require a change in a well defined relationship this is not trivial, and simply weakening the input coupling alone will not accomplish this task and rather would also distort the drop response shape. Following the above procedure the shape is preserved, the step will amount to an impedance mismatch, and the resulting asymmetric (lossless) filter design will drop only a portion of the selected channel and leave the rest on the bus. This can be used as a flat-top channel monitoring filter, with a small (e.g. 1-10%) proportion of the power tapped and the remaining power at the resonant wavelength continuing in the thru port with low distortion.

In FIGS. 13-14, examples of designs for 10%-tap (10 dB), flat-top channel monitoring filters are shown. Based on two and four rings to obtain respectively more selective responses, both designs provide maximally flat (Butterworth) drop responses with a 1 dB passband of 40 GHz. For purposes of providing the design in terms of power coupling coefficients (translated from coupling coefficients that result from our design procedure), both designs are exemplarily assumed to employ ring resonators of identical FSRs of 3000 GHz. This is consistent with the example physical ring designs described earlier. For the second-order (two-ring) design illustrated by configuration B in FIG. 13A, the asymmetric power coupling coefficients are: {0.218%, 0.341%, 15.2%}. To arrive at this design with a flat-top shape, the outlined procedure was applied to a starting-point conventional flat-top, symmetric design (illustrated as configuration A in FIG. 13A) with power couplings {8.04%, 0.175%, 8.04%} and ideally 100% drop transmission. In these designs, resonator losses were assumed to be low (i.e. resonator loss Q's assumed much higher than the total processing Q of the structure, defined by its bandwidth). Thus the step of introducing loss into the design model and recovering the pole positions to recover the response is not applied in this design case, but the following step is still applied of manipulating the remaining degree of freedom (input coupling), while preserving the poles by the described procedure, to engineer a flat-top filter with 10% dropped power. The drop (curve 202) and thru (curve 201) port responses are shown in FIGS. 13B and C, on a linear and dB scale, respectively. As the filter is assumed to have negligible loss, all power not dropped continues on in the thru port. In addition, of two possible solutions in this case for a given dropping power fraction, as described, the chosen geometry of the filter design in this case is oriented such that the input coupling is weaker (e.g. larger gap spacing), which guarantees low group delay (curve 205) and dispersion in the thru port, as illustrated in FIG. 13D. If resonator losses are present, a low group delay in the thru port also implies very low loss for the thru-port signal.

Figure 14A:
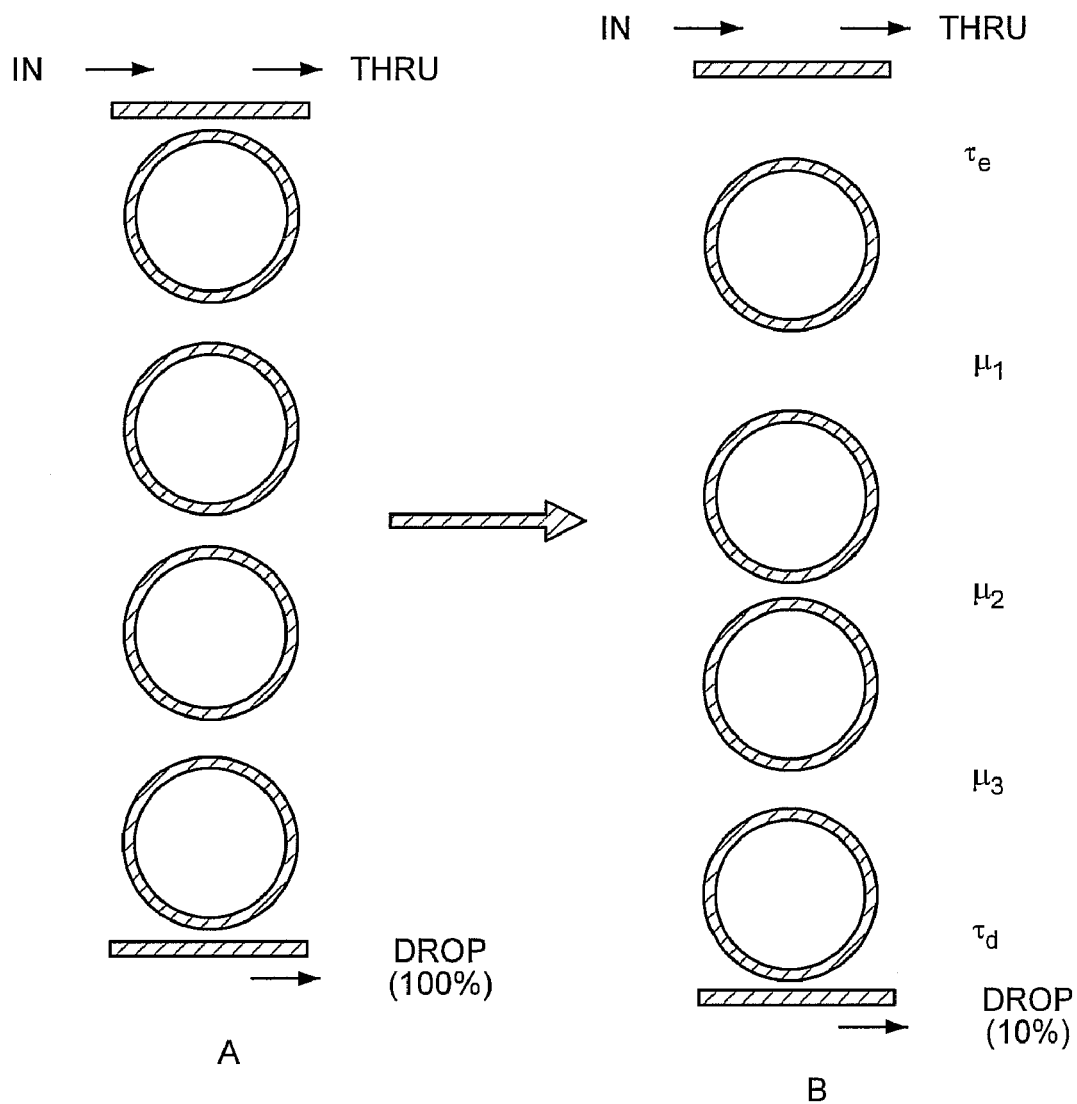
FIGS. 14A-14D are graphs illustrating the drop and thru-port amplitude and group delay responses of a fourth-order (four-ring) asymmetric channel monitoring filter design with a 10% drop; and an illustration of the filter geometry.
Figure 14B:
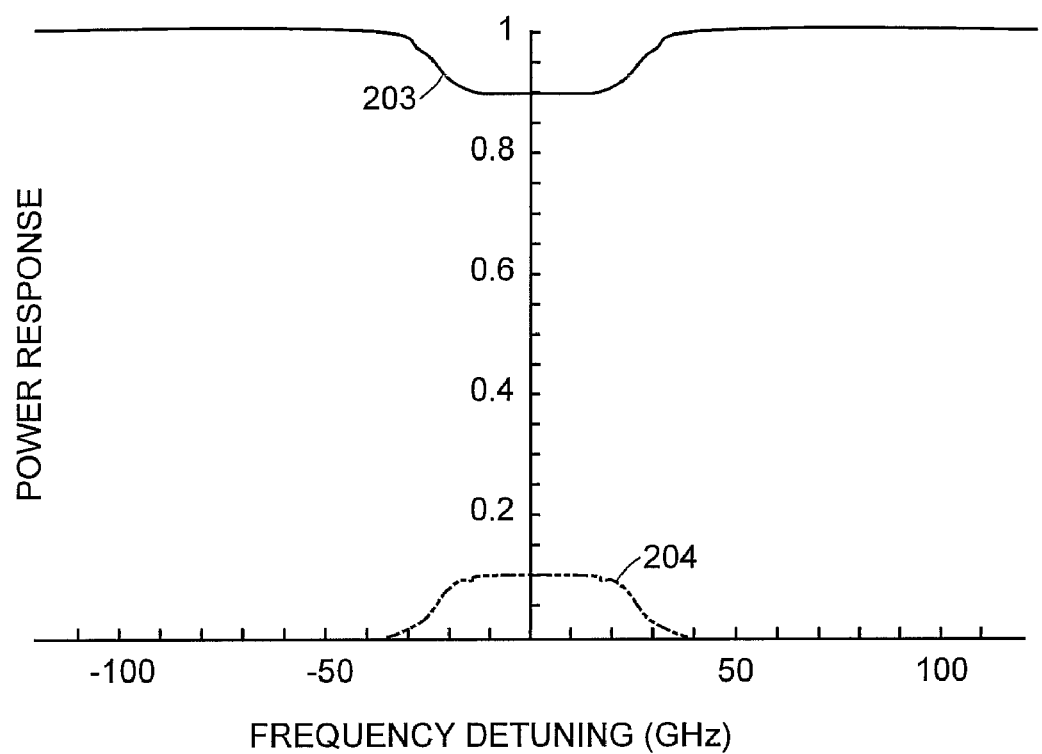
Figure 14C:
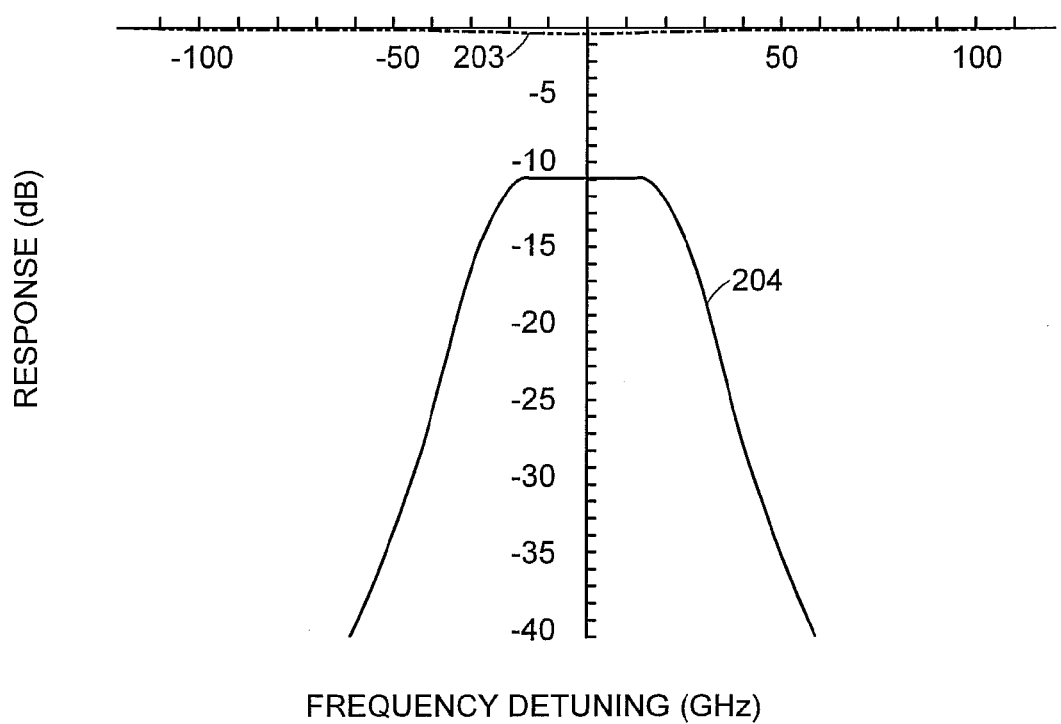
Figure 14D:
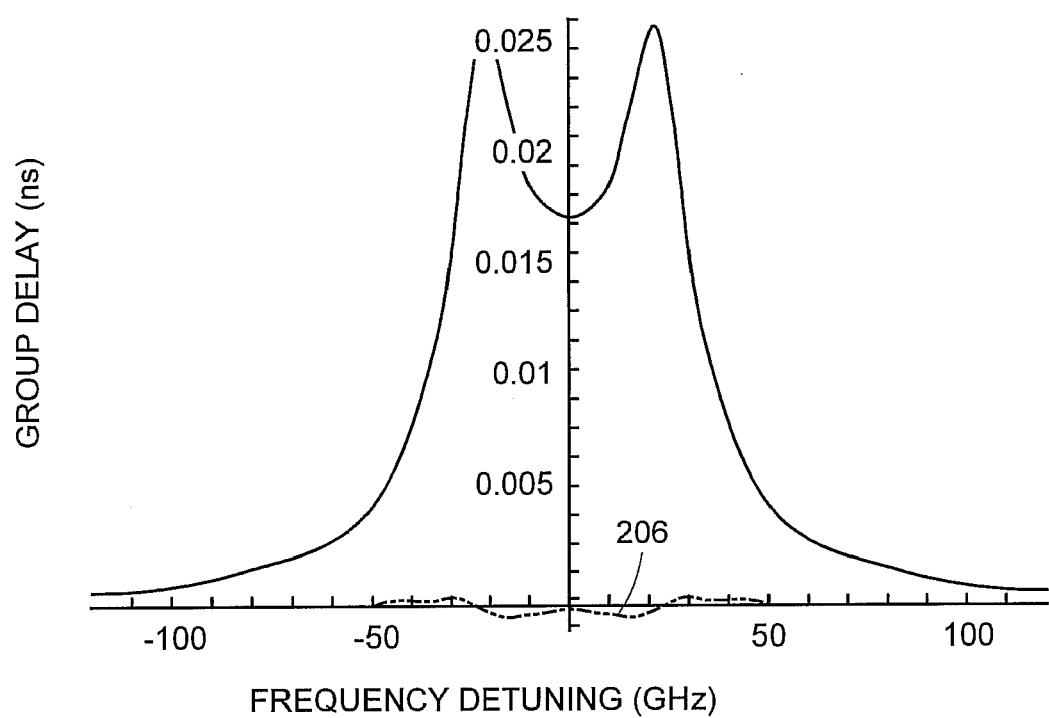

A $4^{th}$-order design with a sharper rolloff is illustrated as configuration B in FIG. 14A. The power coupling coefficients are: {0.170%, 0.101%, 0.143%, 0.590%, 22.8%}. The filter shape is based on that of the conventional synmmetric prototype filter (illustrated as configuration A in FIG. 14A) with couplings {12.2%, 0.175%, 0.0727%, 0.175%, 12.2%} (but which drops 100% of the power). The drop (curve 204) and thru (curve 203) response in FIGS. 14B,C show 10% dropped power with a flat-top response, and 90% continuing in the thru power. FIG. 14D shows that the design with weak input coupling gives small group delay (curve 206) and dispersion for the thru port signal.

While the design assumed low loss, small amounts of resonator loss can be tolerated by these channel monitor designs, with some degradation of the drop port. The thru port, due to the low group delay, is largely insensitive to the resonator losses. The examples demonstrate filters that tap 10% of the power in a given channel, but the procedure applies to any dropping ratio. Our lossless designs for all tap values less than 100% have asymmetric distributions of coupling coefficients.

A further application of the asymmetric filter design procedure with low filter losses is for channel dropping filters near 100% drop transmission. While conventional symmetric designs have been successfully applied for drop filters with low loss, the described procedure can yield significantly asymmetric designs with almost 100% drop transmission. These designs have up to about 50% weaker input coupling and stronger output coupling than the symmetric filter. The technical problem where such designs can provide an advantage is in managing the loss due to radiation scattering at the input coupling region seen by thru-port channels. A weak input coupling would provide a wider input gap spacing, and thus less loss due to input coupler scattering than a symmetric design to all thru port channels, at the cost of a nearly negligible increase in drop loss. This kind of tradeoff may be desirable because much less loss can be tolerated in the thru port of channels, as signals may bypass many filters.

The design procedure for lossless asymmetric designs for optical channel monitor tap filters, or channel drop filters, is summarized as follows:

(1) start with conventional prototype flat-top filter design known in literature, with symmetric coupling coefficient distribution;

(2) keeping resonator losses zero in the model, adjust input coupling coefficient and apply described procedure to preserve drop port response poles and thus the filter shape, until the desired level of dropping power (for optical tap filter) or geometric asymmetry (for drop filter) is achieved;

(3) of two possible designs with same fraction of dropped power, the design with weaker input coupling than output coupling yields lower thru-port dispersion and loss.

The design procedure described dealt primarily with drop-port responses, specifically with the design of flat-top responses for lossy filters, and with impedance matching/mismatch for lossy and low-loss filters, for example to produce flat-top responses with minimum insertion loss, a fractional dropping, or an asymmetric channel-drop filter geometry.

The thru-port stopband-type response is equally or more important in applications such as channel add/drop filters. In filters with loss, the drop and thru-port responses are not both optimized by the same design. In what follows, a lossy thru-port design is first described as a standalone notch (stopband) filter, and then incoherent cascade arrangements of filter stages are explored to satisfy multiple port response requirements. The conventional (symmetric) lossless filter design in FIG. 3 that shows significant drop-response degradation due to introduced resonator loss, sees a comparatively small degradation of the thru-port stopband response. On the other hand, the design of a minimum-insertion-loss drop-optimized filter having a finite Q's generally results in an asymmetric configuration of couplings coefficients achieving a flat-top drop-port response, as shown above. However, such a design does not also provide an acceptable thru-port rejection, as shown in FIG. 4B and FIG. 5. In fact, the in-band thru rejection is greater in the uncompensated, lossless design case even when loss is present, as shown by curve 103 in FIG. 3B. In the following, an example is shown of a lossy filter with an improved stopband in the thru-port. Such notch-type filters are useful for cleanup of optical noise or spurious signals from a spectral band before a new optical signal is added in that spectral slot.

The thru response model in equation (1) has N zeros and N poles to keep fixed while introducing resonator loss if one is to attempt to preserve the filter shape. There are only N+1 variables (the coupling coefficients) available for compensation (excluding the N frequency shifts). Perfect compensation is not achievable, but numerical optimization may be applied to maximize the stopband. However, the thru response is distorted much less than the drop and the following describes a physically intuitive method that may be used to partially compensate it when losses are introduced. The output coupling, for example coupling coefficient $\tau_d$ in exemplary schematic filter of FIGS. 2, controls impedance matching and can be adjusted in concert with the input coupling $\tau_e$ to obtain exactly zero transmission in the thru port (full rejection) at the central frequency only, by choosing positive $\tau_e$, $\tau_d$ such that (from equation (1))

$$\text{For } \frac{s_t}{s_i} = 0|_{\Delta\omega=0}, \tag{4}$$

$$\text{one must have } \frac{1}{\tau_e} = \frac{1}{\tau_{o1}} + \cfrac{\mu_1^2}{\cfrac{1}{\tau_{o2}} + \cdots \cfrac{\mu_{N-1}^2}{\cfrac{1}{\tau_{oN}} + \cfrac{1}{\tau_d}}}$$

This comes at the cost of a narrower stopband and thus less rejection at other frequencies in the stopband. Instead, adjusting the output coupling may also be used to flatten (or purposefully predistort, as described further in the context of the add/drop filter below) the thru rejection level, starting with the lossless design and then including the resonator loss into the model as shown in FIG. 3B. This results in a narrower stopband than originally intended. By increasing the input and ring-to-ring couplings the response may be broadened and the rejection further improved, but generally at the cost of additional loss experienced by adjacent channels.

Figure 7A:
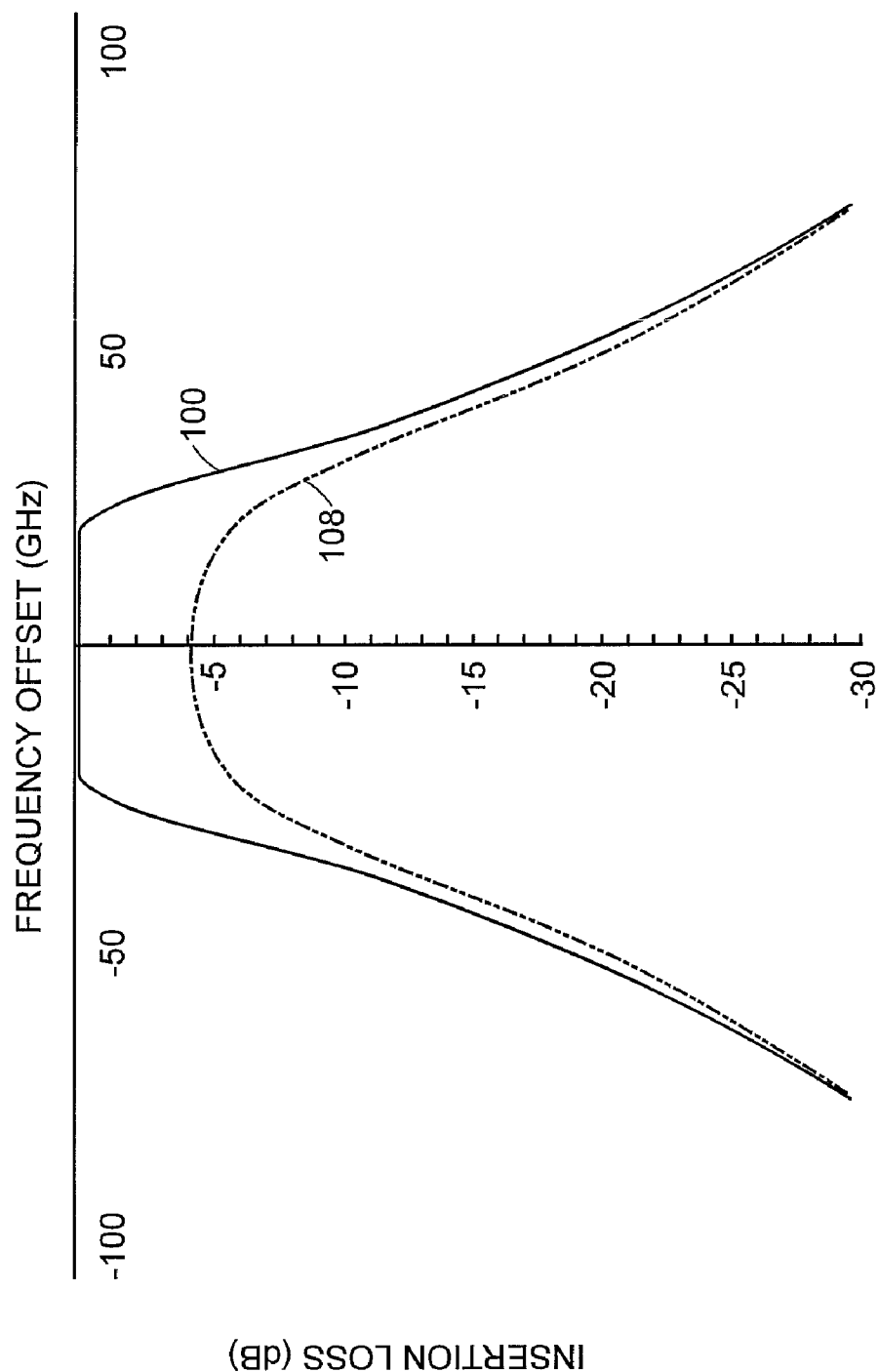
FIGS. 7A-7B are graphs demonstrating an asymmetric lossy filter design for improved thru port rejection.
Figure 7B:
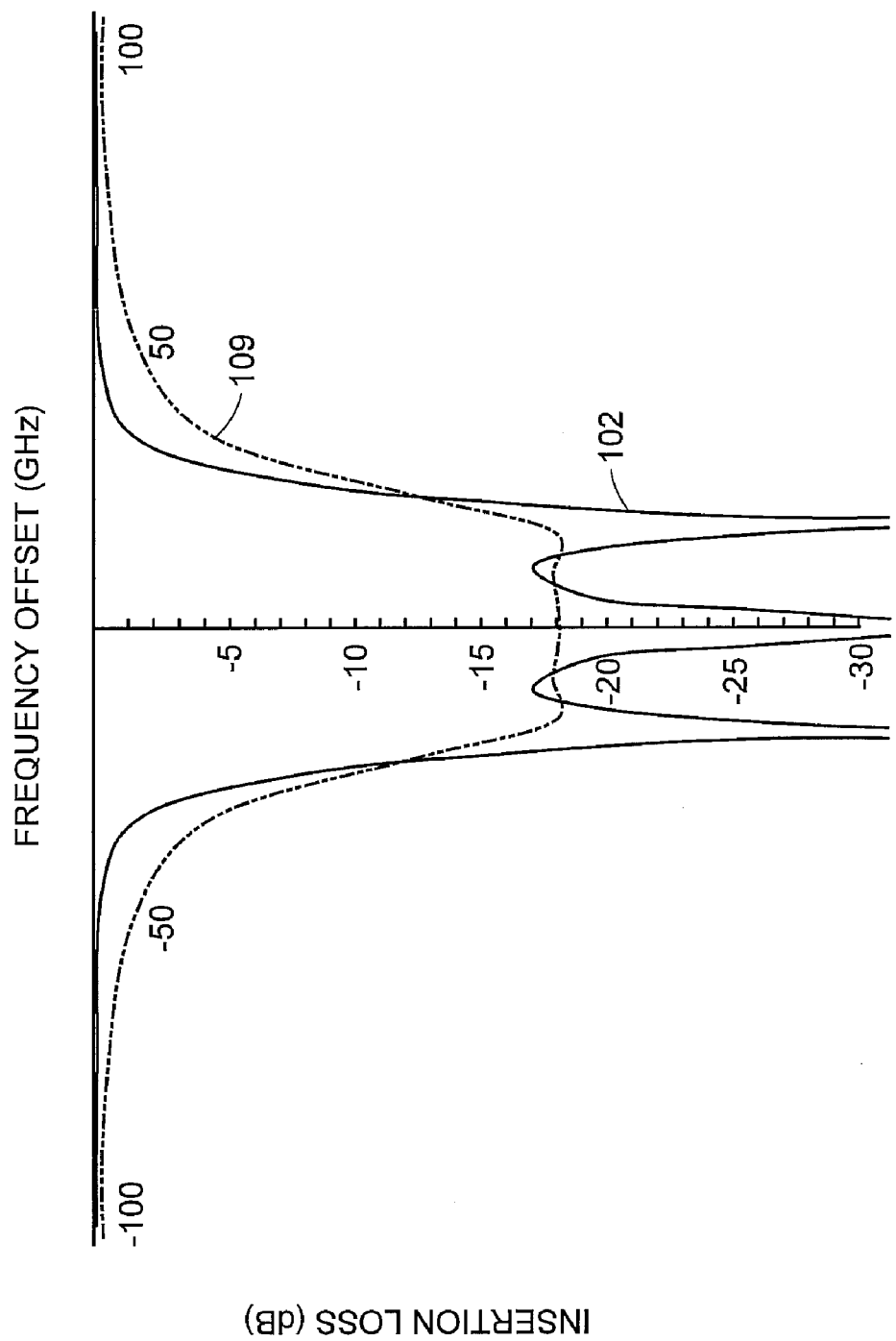

In the following, an example is given of design of a 3-rd order lossy filter comprising microring resonators intended for notch-filter-type operation with a flattened stopband in the input-to-thru response. The drop response here is disregarded. The design requirements are exemplarily the same as for the preceding (drop-optimized) example. By adjusting the output coupling $\tau_d$ it is possible to flatten the stopband rejection in the thru response, via the choice of asymmetric power coupling coefficients: {8.175%, 0.00163%, 0.00163%, 9.39%}. The output coupling is stronger than the input coupling FIGS. 7A-7B show the corresponding in-drop (curve 108) and in-thru (curve 109) spectral response, respectively. Ideal lossless (symmetrical) spectral responses are also shown (curves 100 and 102). The drop response, shown as curve 108 in FIG. 7A, is virtually the same as that corresponding to the degraded lossless design shown as curve 101 of FIG. 3A. The thru-port response, shown as curve 109 in FIG. 7B, has been flattened and a slight improvement in rejection of about 1.5 dB is seen, albeit not over the entire filter bandwidth. To cover the filter bandwidth, all couplings can be increased slightly at the cost of some loss in adjacent channels, as will be described below Based on the above discussion, separate designs result in optimal in-to-drop and in-to-thru responses, depending on which is the aim of the designer. This is because both responses are controlled by the same set of filter parameters (couplings, losses, resonance frequencies) that do not permit independent design of the two. Channel add/drop filters have up to four response functions of interest. They require the functionality of both flat-top bandpass response in the in-to-drop path and a high-extinction stopband in the in-to-thru response, in addition to similar requirements, respectively, for the add-to-thru and add-to-drop responses.

Figure 6B:
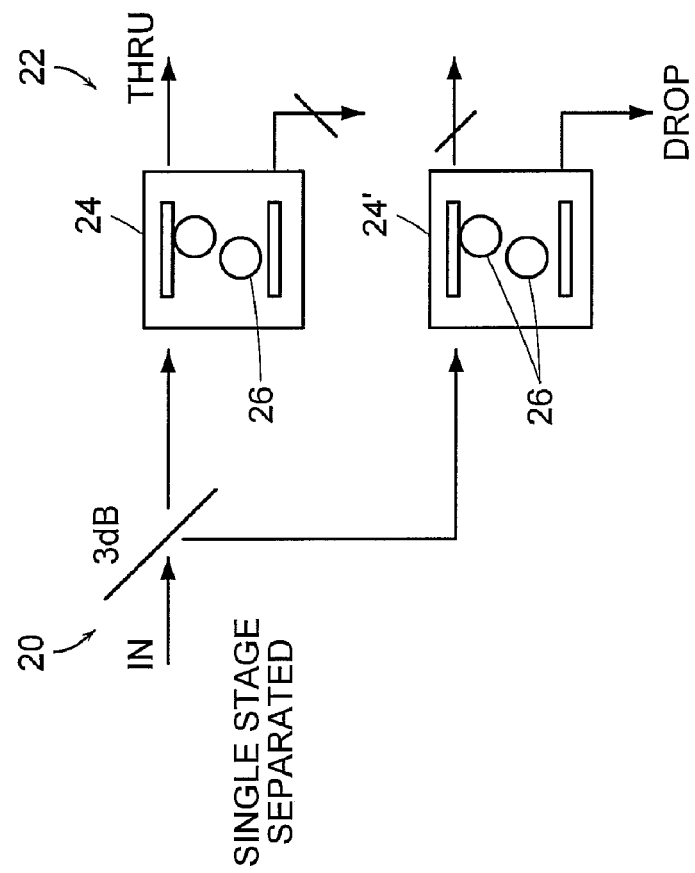
FIGS. 6A-6C are schematic diagrams showing exemplary filter topologies for partial decoupling of the design parameters for the drop and thru filter responses to permit partially independent design of input-to-drop, input-to-thru and add-to-thru and add-to-drop transfer functions.
Figure 6A:
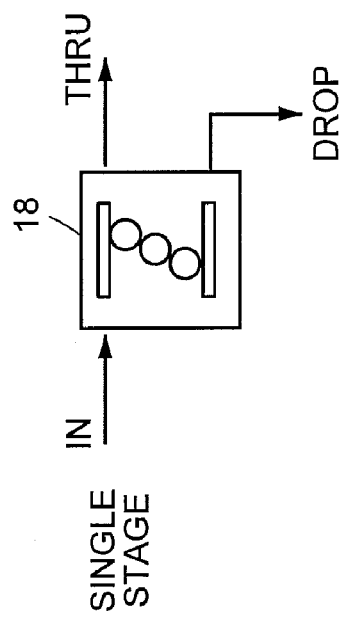
Figure 6C:
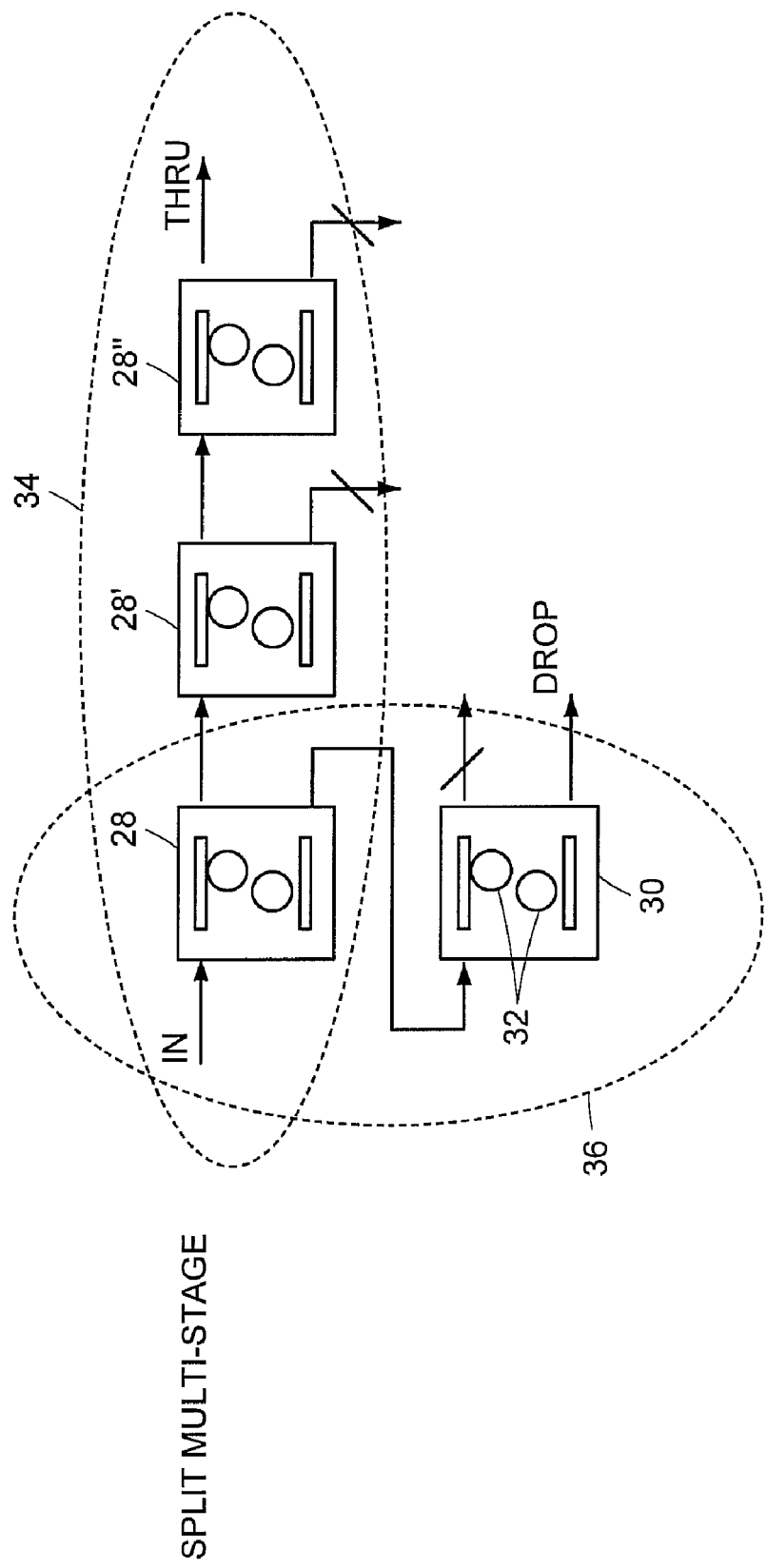

If specifications must be met for all response functions, a single lossy filter, henceforth referred to as a filter stage, may not suffice. A more complex, cascaded geometry, with examples given in FIGS. 6B-6C, is introduced to allow for fully or partially independent design of drop and thru-port responses. The invention provides a cascaded arrangement of coupled-resonator filter stages that gives the ability to meet spectral design criteria in both ports, in the presence of loss and fabrication errors, also adding tolerability to error.

First, the incoherently cascaded, multiple-stage filter topology is described. FIGS. 6A-6C show a comparison between single stage and multi-stage cascade filter topologies. In particular, FIG. 6A shows a conventional single-stage filter topology 18. A filter stage, used as the logical unit for more complex designs, is defined as any optical filter with accessible waveguide ports. Each of the design examples given thus far qualifies as a single filter stage with certain relevant input and output ports. FIG. 6B shows a simple incoherently-cascaded multiple-stage topology 22 that comprises three cascaded stages, specifically a beam splitter stage 20, and two filter stage structures 24 and 24' each including resonator structures 26. FIG. 6C shows an example of a general split-path multi-stage topology wherein a first path 34 (thru-path) connects the input and thru ports of the compound filter and comprises three cascaded filter stage structures 28, 28' and 28"; and a second path 36 (drop-path) connecting the input and drop ports of the compound filter, shares with the thru-path the first filter stage structure 28 and comprises a further filter structure 30. Incoherent cascade here is taken to mean the absence of optical feedback between stages, namely that the optical output of an initial filter stage may lead to the input of a second stage, but outputs of the second stage are not permitted to feed back to any input ports of the said first stage such that there is substantial optical feedback. In general, each stage may contain any order resonant filter, and the stages that constitute the compound filter may not, in general, be mutually identical. While FIG. 6C shows a total of four stages, in the general case, each of the thru and drop response function paths can see one or more cascaded stages.

The simple topology in FIG. 6B with a beam splitter stage enables fully independent design for the spectral characteristics of each response function in the subsequent filter stages in the drop and thru paths, at the cost of a flat 3 dB insertion loss in both paths. On the other hand in the single stage of FIG. 6A, the two responses are fully interdependent. With an initial filter stage which provides some spectral shaping, the multistage arrangement in FIG. 6C enables lower loss than FIG. 6B and partially independent design of the response functions in the subsequent stages of each path. Additionally, the add-to-thru response is not indicated, but shares the last stage in the in-to-thru path 34 and may use additional stages. For add-drop filters the add-to-drop path is generally desired to provide very high extinction. Since the add and drop ports of the compound filter are physically disconnected (in contrast to the single stage of FIG. 6A), the topology alone guarantees this requirement. Such "add-after-drop" arrangements are commonly used.

To satisfy the drop and thru requirements of an add/drop filter a cascade of a drop-optimized and thru-optimized stages may be employed as shown in FIG. 6C. The multistage topology in FIG. 6C suggests a common first stage for the in-drop and in-thru response signal paths, and separate cascaded stages following the first, thus permitting partially independent design of the two responses. In the exemplary designs of the present invention, there is only one stage in the drop path in all cases.

Figure 8A:
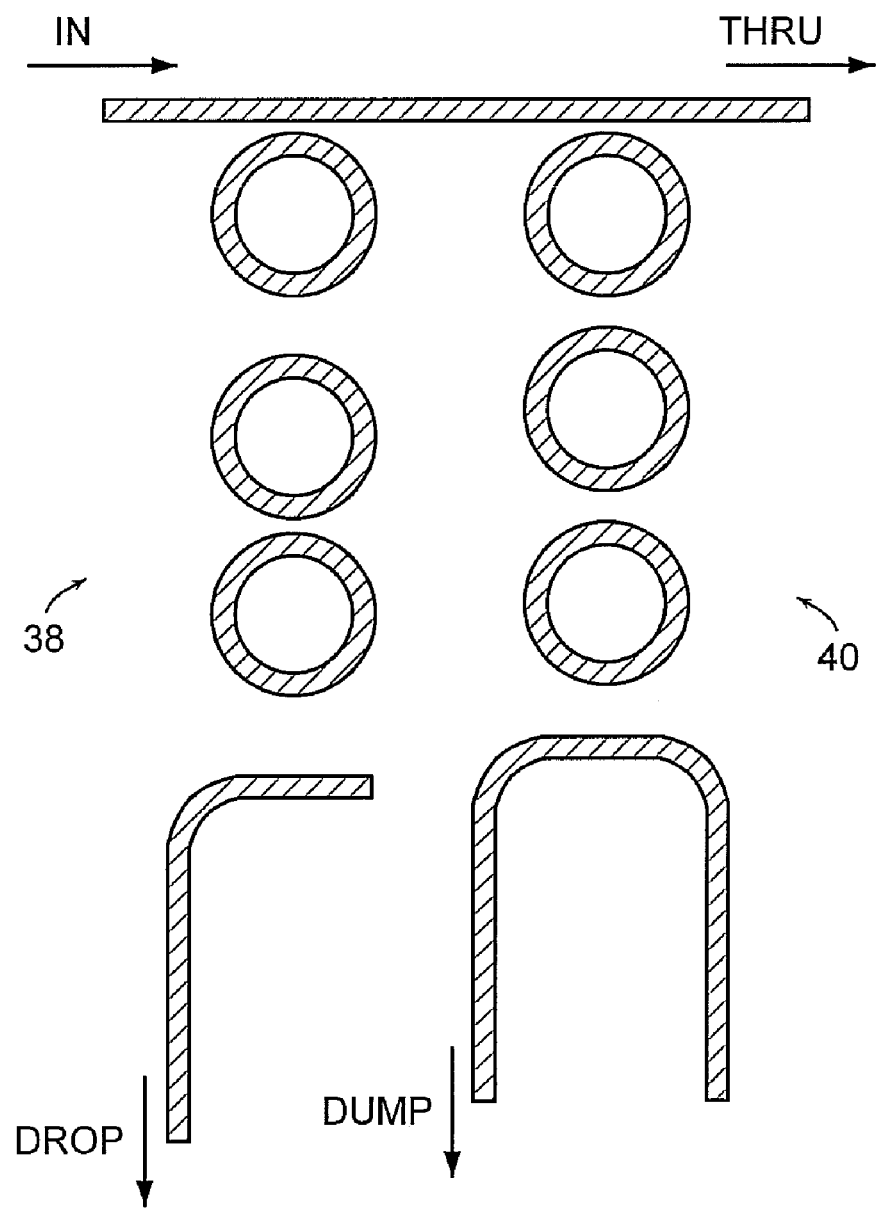
FIGS. 8A-8B are schematic diagrams illustrating multi-stage filter designs using asymmetric filter stages.
Figure 8B:
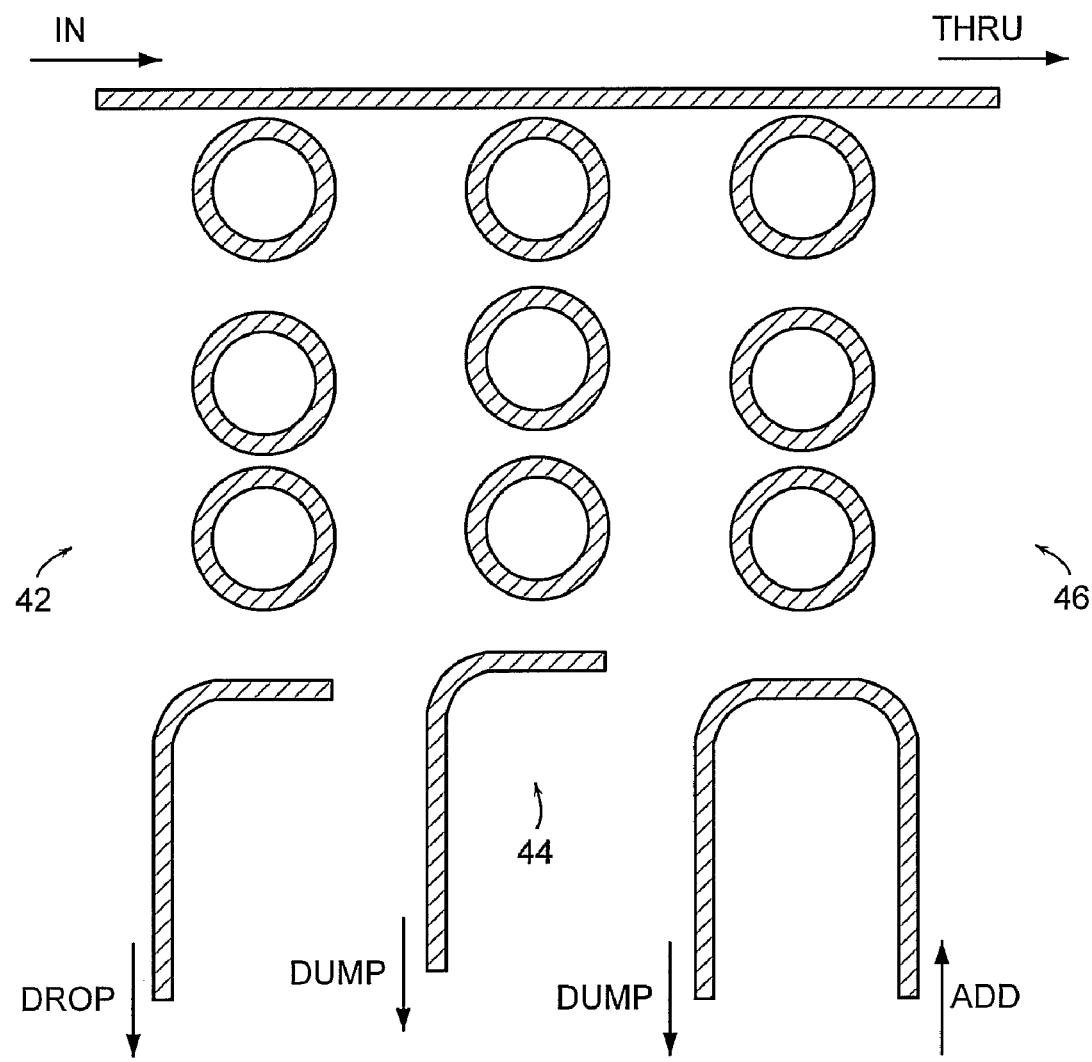

FIGS. 8A-8B show exemplary designs of multistage filters using asymmetric stages. In particular, FIG. 8A shows a lossy drop filter where the first stage 38 is designed for drop-response while the second stage 40 is designed for thru-response. In order to satisfy for in-drop and in-thru specifications of a channel drop filter of FIG. 8A, two stages may be used in the thru-path, the first stage 38 being a drop-optimized stage of the kind, for example, of the one shown in FIGS. 4A-4B and the second stage 40 a thru-optimized stage of the kind, for example, of the one shown in FIGS. 7A-7B.

Figure 9A:
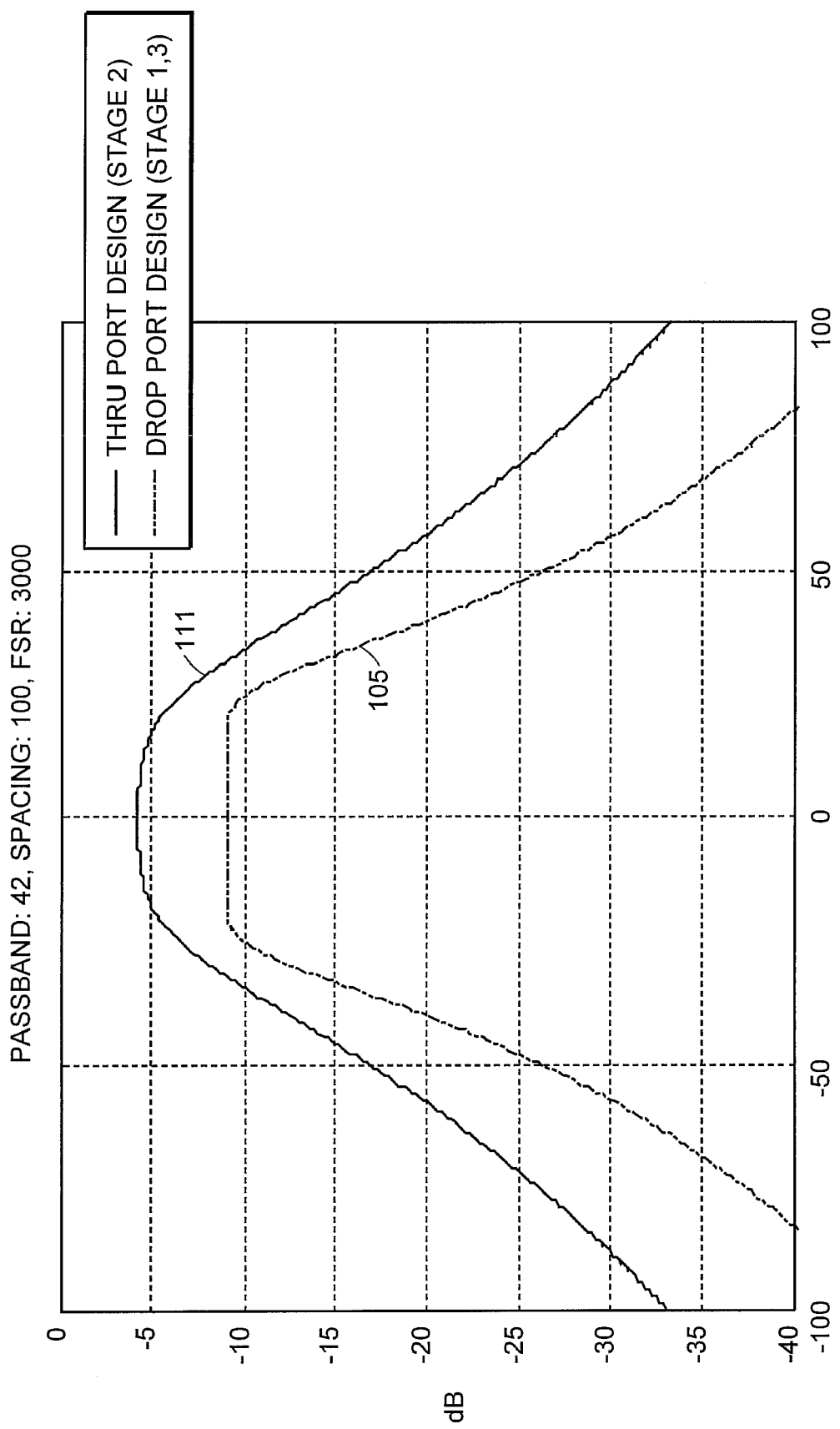
FIGS. 9A-9B are graphs demonstrating responses of the individual stages of a multistage design of a filter using asymmetric stages.
Figure 9B:
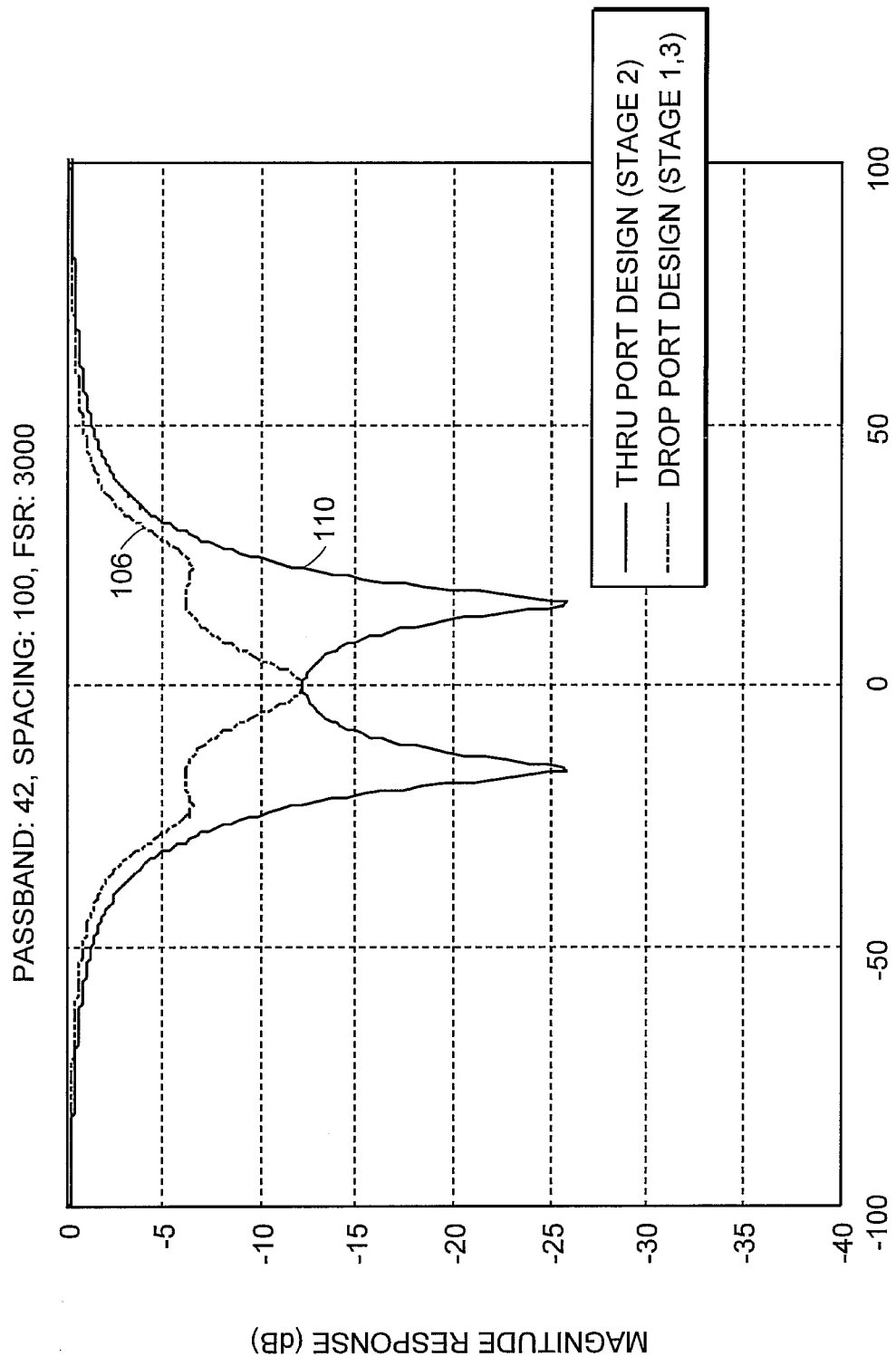

FIGS. 9A-9B show the performance of the individual stages 38, 40 of the multistage filter design using asymmetric stages. Since the drop-optimized stage 38 contributes to the thru-port rejection, the thru-optimized stage 40 can be redesigned to contribute less rejection at the center frequency where the drop stage 38 already contributes (see FIG. 4B), and more at the edges by strengthening the output coupling, and strengthening the ring-ring coupling (in this case by about 20%) to broaden the response. This thru-port stage 40 performance is shown in FIG. 9B, curve 110, along with the drop stage 38 performance (also of the thru port), curve 106, same as in FIG. 4B. FIG. 9A shows lossy drop port spectral responses of the drop-optimized stage 38 (curve 105, same as in FIG. 4A) and of the thru-optimized stage 40 (curve 111).

Figure 10A:
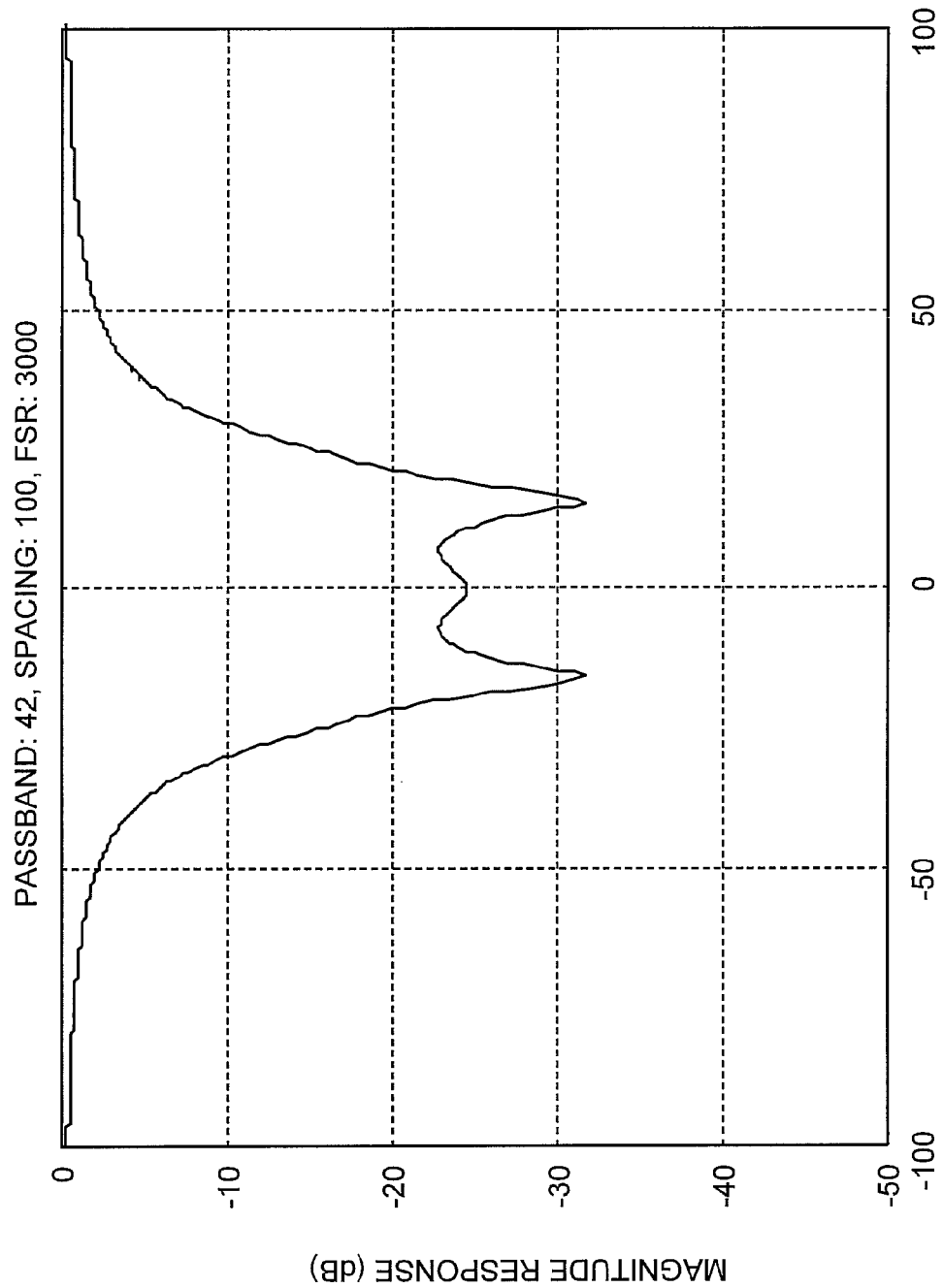
FIGS. 10A-10B are graphs demonstrating the overall thru-port responses of two multistage designs of a filter using asymmetric stages.

The coupling coefficients of this thru-stage 40 are {8.1751%, 0.1796%, 0.1796%, 15.6884%}. The total two-stage filter response is shown in FIG. 10A. FIG. 10A shows a total thru-port response of a 2-stage drop filter as shown in FIG. 8A (combination of stages in FIGS. 9B). Because the present design is only a channel drop filter (no add port), a total in-band rejection in the thru-port of about 22 dB may be acceptable, as a subsequent add stage is likely to provide sufficient in-band rejection to attain the 30 dB level that is preferably desired in applications.

It is restated that in the presence of loss, multiple stages may be required in order to meet both in-to-drop and in-to-thru spectral requirements. In that case, it was shown that the best thru stage design does not employ standard filter theory for an ideal bandstop (notch) filter design because it can benefit here from taking into account the contribution of the prior stage which was optimized for the drop response.

A complete add-drop filter has the ability to add a channel in the vacant spectral slot after a signal has been dropped. In multiple stage realizations such as the two-stage filter described above, the last stage must be used for adding a signal (as a subsequent stage would drop the signal again).

Accordingly, the second stage 40 in the two-stage filter shown in FIG. 8A can be used to insert an add signal, but this stage does not have an optimal add-to-thru response (i.e. "drop response" from the back side of the filter layout, see curve 111 in FIG. 9A) as it is optimized for in-band thru-port rejection. It may be possible for the add signal to be electronically predistorted by the signal transmitter taking into account the shape of the filter response. However in most cases this isn't practical. In addition, the total thru-port rejection of 22 dB is under the 30 dB usually required in practice.

If the add signal takes a large proportion of the filter bandwidth, and requires flat-top passband characteristics, another drop-optimized stage may be used. If the add-to-thru response specs for the add-port are different than those for the in-drop response, the stages will not be identical. For simplicity, assume the specs to be the same so that the stages are arranged in the order A-B-A (where A=drop-optimized stage, B=thru-optimized stage). FIG. 8B shows a full lossy add/drop filter where the first 42 and third stage 46 are drop-optimized, while the middle stage 44 is designed for the thru port. This filter can satisfy drop and thru response spectral criteria in the presence of loss for all four response functions, with a finite, but minimized, insertion loss that is due to the resonator loss. This geometry, shown in FIG. 8B, allows in-to-drop, in-to-thru, and add-to-thru criteria to be met. Since the add and drop ports are not connected, there is automatically virtually no crosstalk between them, as desired.

Figure 10B:
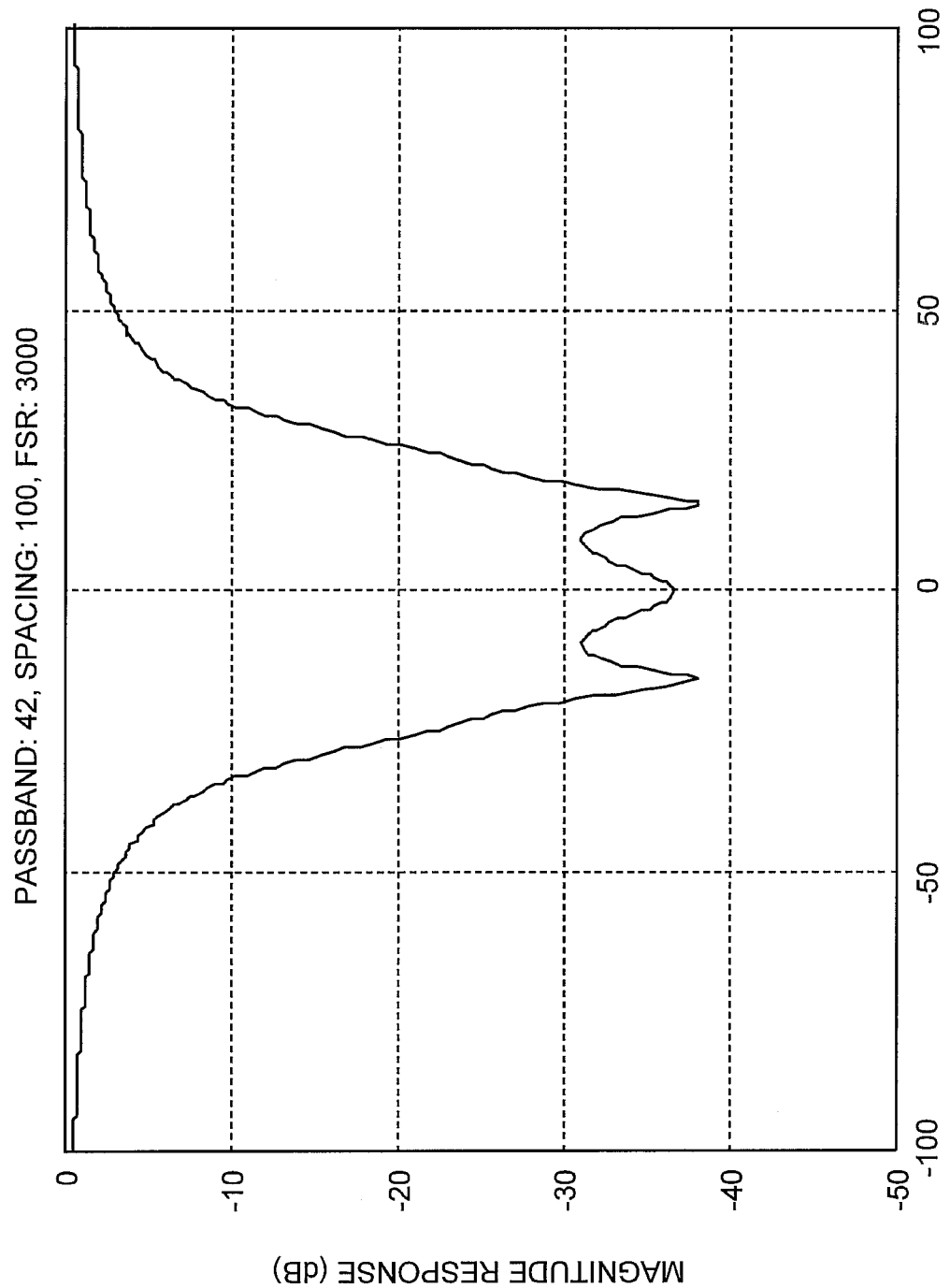

Insertion loss exists in all ports due to the loss in resonators, but all spectral response shape criteria can be met. Then, the challenge will be to design resonators of low enough loss to meet desired insertion loss specifications. Alternatively, since the filter shape is correct, simple broadband amplification can compensate for the flat drop loss. This is in contrast to the idea of compensating the loss within the resonators themselves, which would be more challenging. FIG. 10B shows the total thru-port response of a full 3-stage channel add/drop filter as shown in FIG. 8B. This complete filter has a flat in-to-drop and add-to-thru response, represented by the flat-top curve 105 in FIG. 9A, and 30 dB rejection in the in-to-thru response, shown in FIG. 10B, as required by conventional optical add/drop filters. The middle stage thru-response was designed to provide this total thru response (compare to individual stage thru-port responses in FIG. 9B). The last stage is oriented to have the greater thru-port rejection response on the in-to-thru side, not on the add-side, because the signal continuing on the add-port's bypass path is discarded, and thus has no requirements on in-band rejection.

While the examples used 3-ring filters and 2 or 3 stages, the same method may be applied to N-ring filter stages for any number N, in any number M of stages. Furthermore, the number of rings in each stage need not be the same as they are partially independently designed.

Figure 11A:
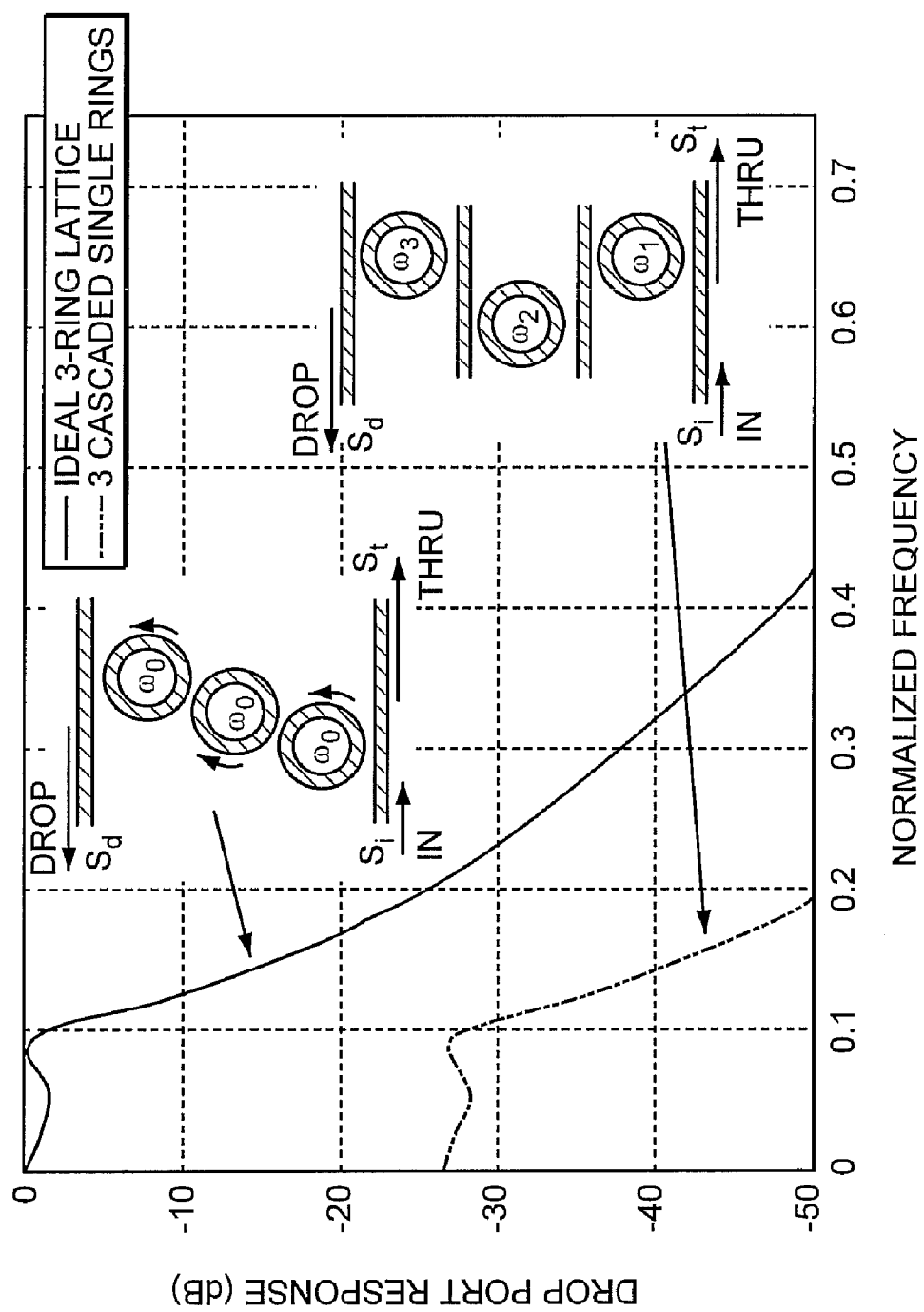
FIG. 11A is a graph demonstrating the comparison of the drop responses of a high-order series-coupled ring filter and a multi-stage cascade of single-ring stages.
Figure 11B:
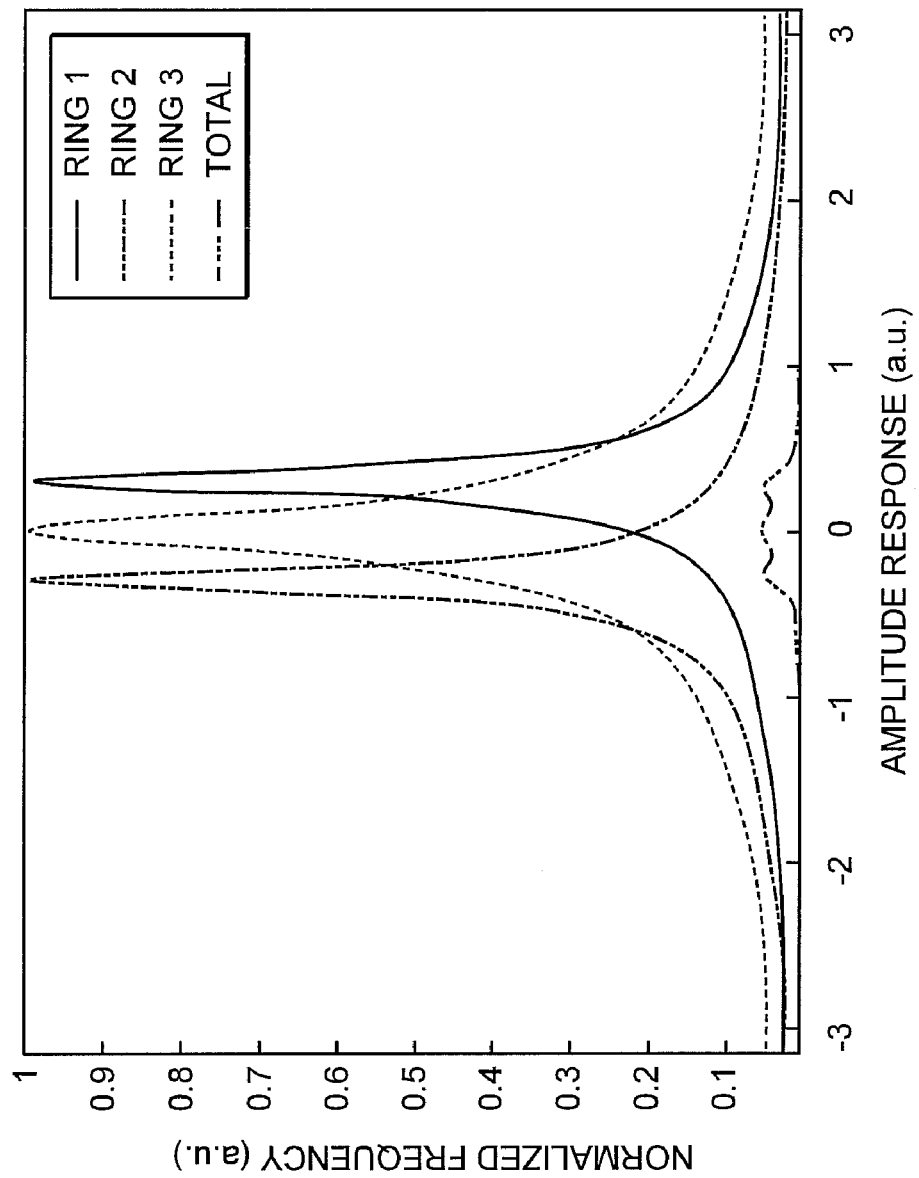
FIG. 11B is a graph demonstrating the drop transfer function of each single-ring stage and of the total multi-stage filter.

This multiple-stage filter architecture, as shown in FIG. 6C, is different from the known cascading of single rings, which is very lossy if one attempts to obtain higher order response by employing different ring radii (frequencies). FIG. 11A shows the comparison of drop responses of a single, high-order series-coupled ring stage, and a multi-stage cascade of single-ring stages. FIG. 11B illustrates a drop transfer function of each stage and of total multi-stage filter, as shown in the right-hand insert of FIG. 11A, composed of single ring stages. FIGS. 11A-11B show that a cascade of single rings is able to obtain a higher-order bandpass response, but with prohibitive losses (>25 dB here in the absence of any resonator losses), even in the case of lossless resonators. In the design according to the present invention, the stages which are cascaded contain multiple coupled rings, which allows for low-loss performance. In the exemplary embodiment described above, the drop losses are equal to about 9 dB (see curve 105 in FIG. 9A), but these are inherently due to the illustratively chosen value of the ring loss (Q=15,000).

Figure 12A:
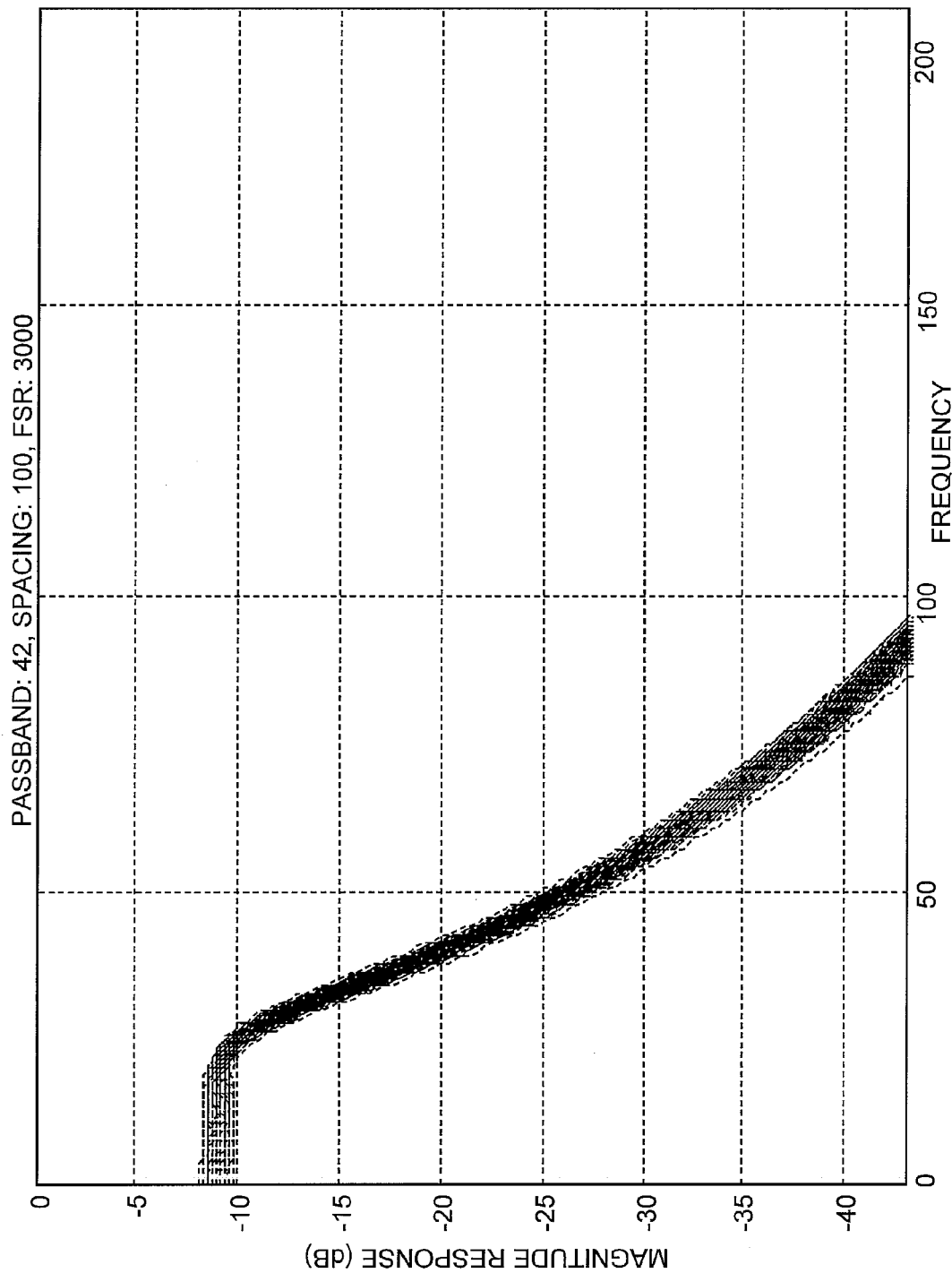
FIGS. 12A-12B are graphs demonstrating the tolerance test of the responses shown in FIGS. 9A and 10B of a multistage add-drop filter as shown in FIG. 8B.
Figure 12B:
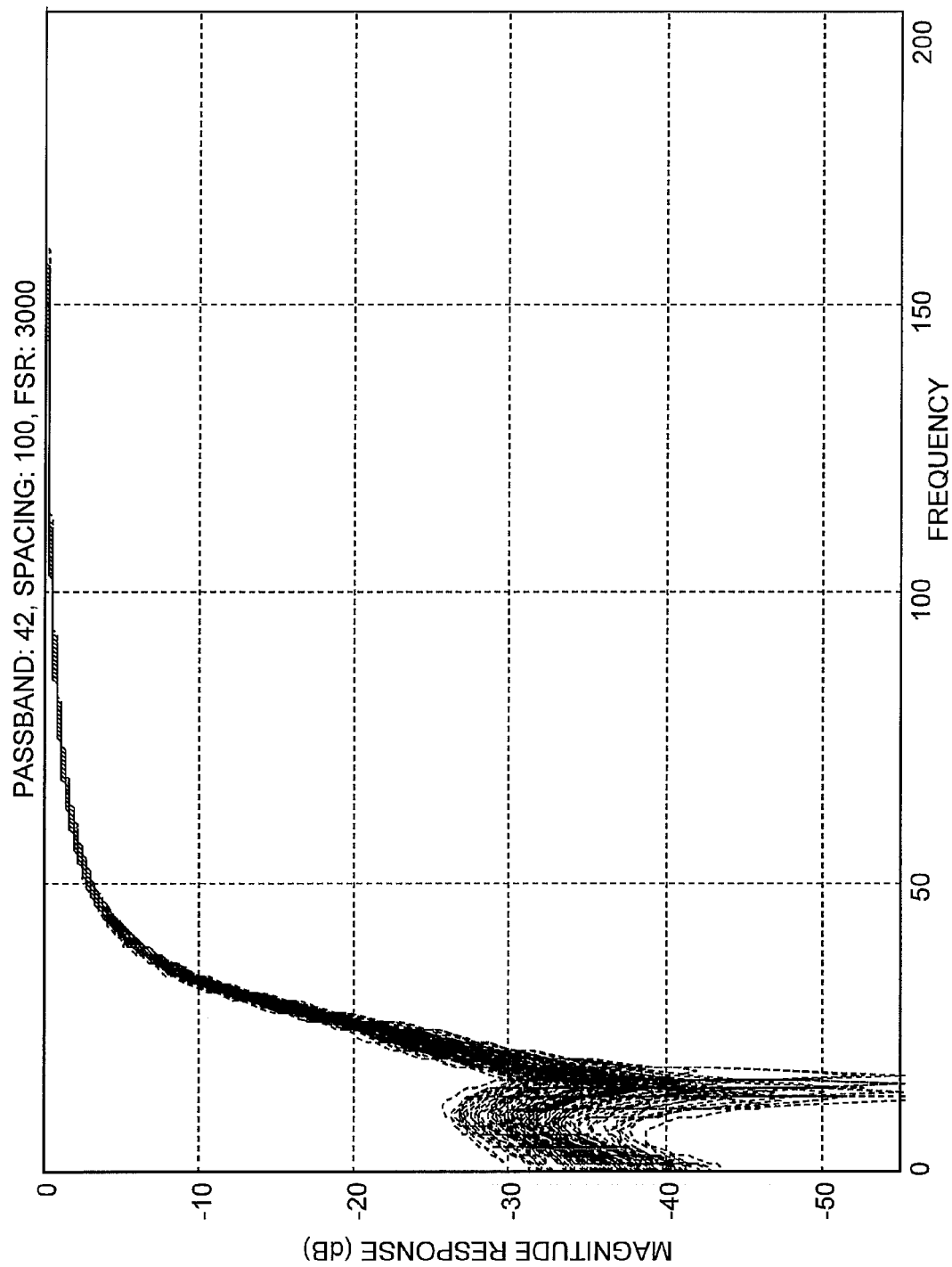
Figure 13A:
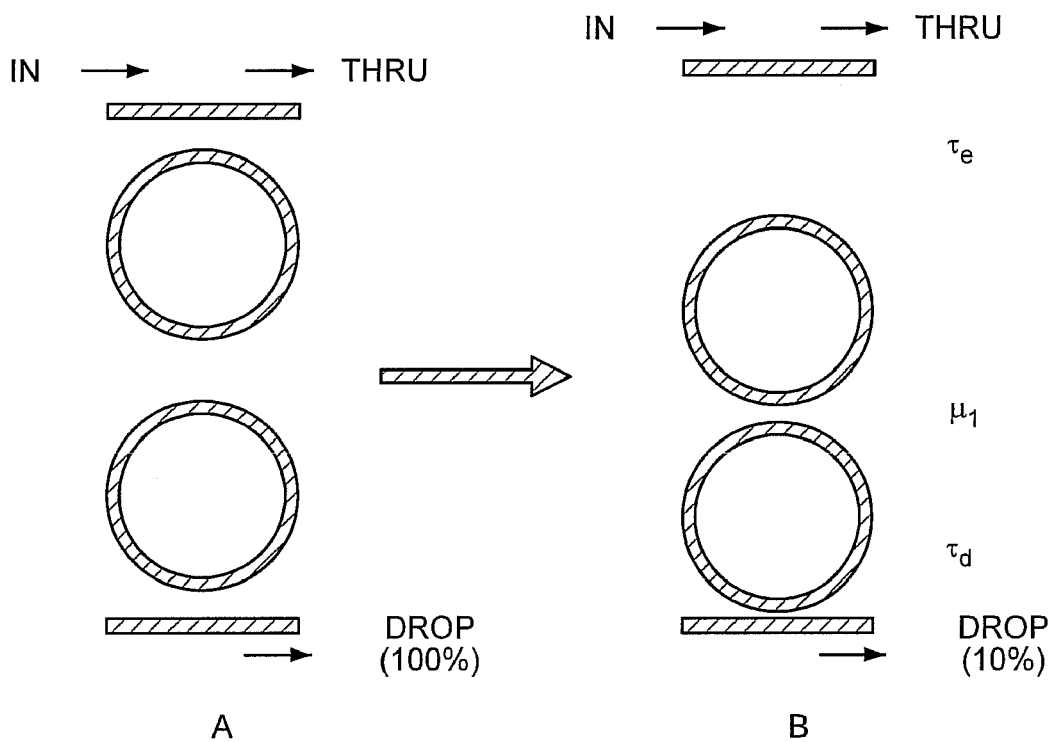
FIGS. 13A-13D are graphs illustrating the drop and thru-port amplitude and group delay responses of a second-order (two-ring) asymmetric channel monitoring filter design with a 10% drop; and an illustration of the filter geometry.
Figure 13B:
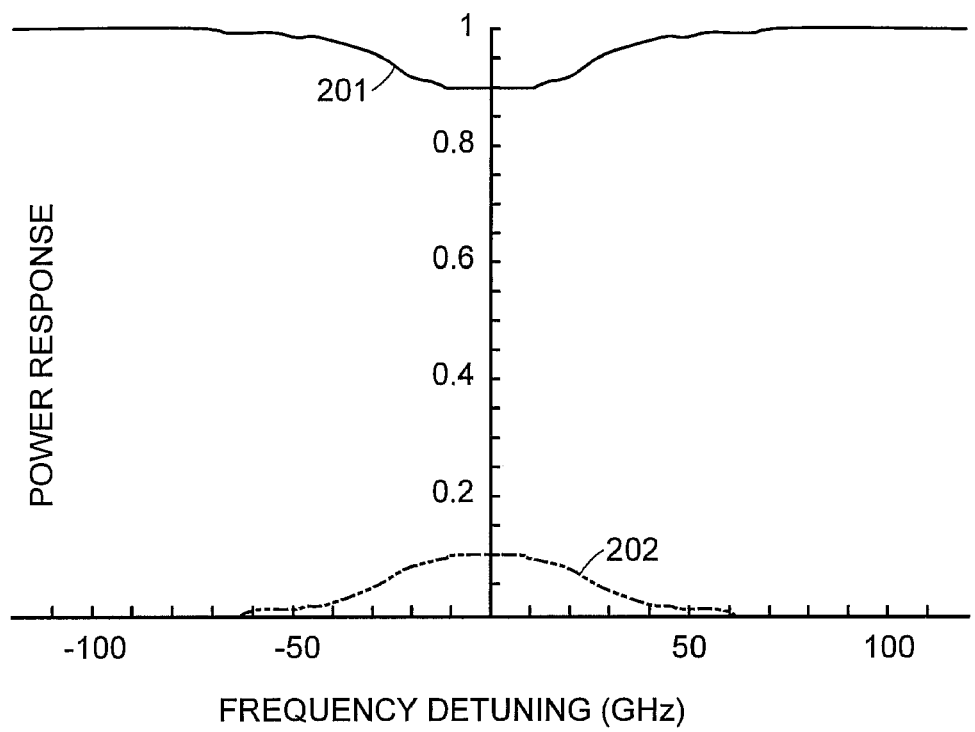
Figure 13C:
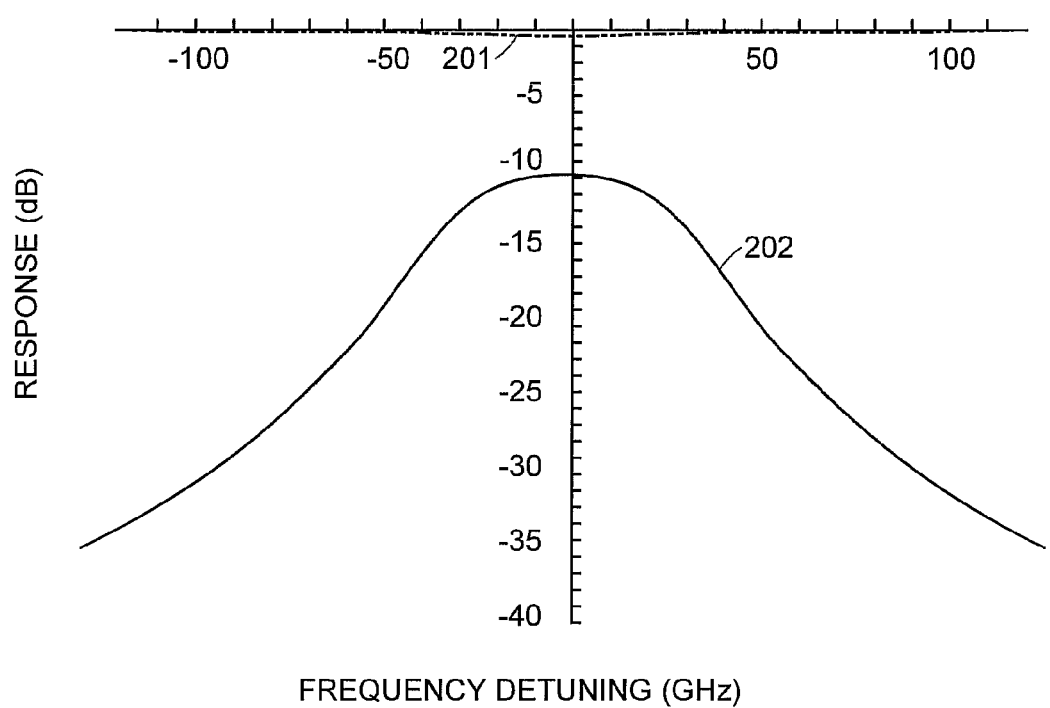
Figure 13D:
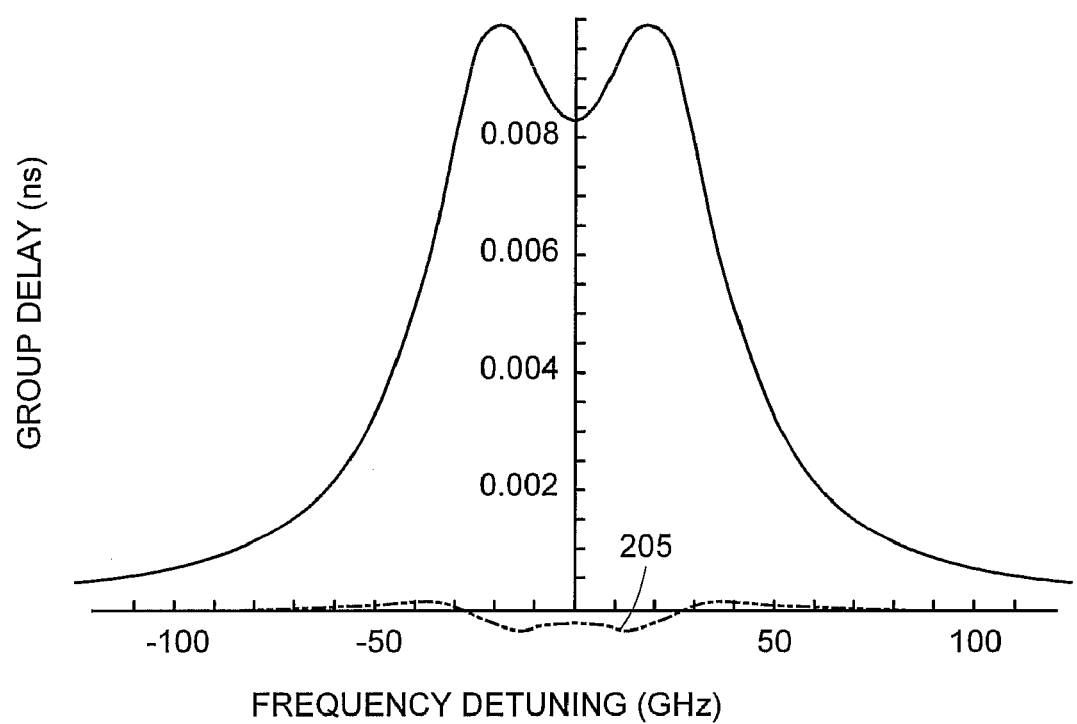

The multistage configuration using higher-order stages has another advantage in that it is resilient to fabrication error. The thru-port response in channel add/drop filters is sensitive to variations of the coupling coefficients. In the multistage design according to the present invention, the incoherent cascading of the three stages improves the tolerability to error. FIGS. 12A-12B show results of the tolerance test of the exemplary multistage add-drop filter, whose spectral responses are shown in FIG. 9A (curve 105) and FIG. 10B. FIGS. 12A-12B show overlaid the responses of 100 of the above add/drop filters whose coupling coefficients are varied with a uniform random distribution of (−6%, +6%) error in coupling ). The drop response is unaffected, and the thru-port in-band rejection degrades by only about 4 dB to about 26 dB. The physical realization of the proposed asymmetrically-coupled multiple-resonator drop and thru filter designs is intended to be in the form of a set of coupled (i.e. closely-spaced) dielectric resonators coupled to two waveguides: a bus and an add/drop signal waveguide. The realization may be different in the case of some types of resonators, such as coupled quarter-wave-shifted Bragg resonators where there is only one waveguide, with the drop port obtained in transmission, and the thru port in reflection from the Bragg resonator structure. The physical realization of the filters will be the same as the currently known realizations for lossless optical coupled-resonator filter designs.

The resonators and waveguides may be in one dielectric chip layer, or on several lithographically-defined layers. Accordingly, coupling may be lateral or vertical.

The physical realization of the contribution of this disclosure, i.e. of a deliberately obtained asymmetric distribution of coupling coefficients, may take several forms. The coupling between waveguides and resonators and between two resonators is controlled by the spacing between them, by the phase matching, and by the cross-sectional shape of their optical mode distributions. More weakly confined modes will couple more strongly with the same spacing and phase matching.

The most direct physical embodiment of the asymmetric coupling design is illustrated in FIGS. 2B and 2C, where the asymmetric coupling coefficient distribution is implemented by an asymmetric distribution of waveguide-ring and ring-ring spacings, chosen to correspond to the desired coupling coefficients.

One may also employ the same gap spacings as a lossless design, and apply other methods to weaken or strengthen the coupling. A way to obtain weaker coupling is to mismatch the propagation constants of the coupled waveguide and ring, or ring and ring, in the coupling region. This may be done by changing the core index of one of the two waveguides (in design, or post-fabrication by e.g. UV-exposure of a photosensitive core or cladding material), or by changing the shape of one waveguide or the other. A smaller core or a lower core index reduces the propagation constant in the waveguide. Another dielectric object/structure, which does not have any guided modes that can phase-match with one of the waveguides in proximity of the coupler, can be placed in an asymmetric arrangement, i.e., in such a way that it alters the propagation constant of one guide more than the other.

A third way to alter the coupling strength is to change the cross-section of the bus waveguide or the microring waveguide, making use of the change in mode confinement to alter the coupling coefficient. Here, care must be taken to control the change in radiation loss due to a change in confinement.

In all cases of modifications to the filter geometry to produce the desired asymmetric distribution of coupling coefficients, the resonators must in the end remain tuned to synchronous resonance frequencies.

Of these methods, the simplest and preferable is the first one-using an asymmetric distribution of resonator spacings. However, in some cases, such as post-fabrication correction or in the case of resonators with a fixed set of possible positions such as cascaded waveguide Bragg grating resonators, another of the above approaches or a combination may be of advantage.

Prior optical coupled-resonator filter designs have relied on design methods for lossless filters. As a result, the introduction of loss necessarily degrades the response, as shown in the responses of FIGS. 3A-3B.

In filtering applications where passive coupled-resonator filters are used that require selective bandpass/bandstop characteristics, lossless optimal designs can degrade severely in spectral performance when physical resonators of finite loss are used in the filter realization. Dielectric resonators have a fundamental source of loss through radiation (with the exception of a few special geometries such as photonic crystal cavities), as well other loss sources such as scattering from couplers and waveguide surface roughness. Therefore, filters using lossy resonators may not be capable of meeting design criteria by relying on lossless designs.

The invention makes it possible to recover a flat-top drop response and improve the thru-port rejection by different, in most cases asymmetric, coupling coefficient distributions. The use of multiple cascaded stages can be demonstrated to meet the spectral design criteria for all response functions of interest in an add/drop filter, provided that the loss which fundamentally results from using lossy resonators is acceptable. The invention teaches the "impedance-matched" design that gives minimum insertion loss in the drop port for a given resonator loss, and shows a response-predistorted thru-port in the middle filter stage of a complete three-stage channel add/drop filter, permitting the simultaneous fulfillment of in-to-drop, in-to-thru, add-to-drop and add-to-thru spectral requirements. Flat-top lossy drop-port designs have the advantage of retaining the designed low amplitude distortion and in-band dispersion provided by flat-top filter designs. If necessary, the flat insertion loss they experience can simply be compensated by passing through a broadband optical amplifier.

The invention has also provided useful filter designs using asymmetric coupling coefficient distributions for applications other than lossy filter design. In the low loss regime, a procedure of design for and example designs of flat-top, coupled-resonator tap filters for optical channel monitoring applications have been presented. They drop a fraction of the signal power in the chosen wavelength band, leaving the remaining signal to pass with low dispersion and low loss.

The potential commercial applications for dielectric resonator filters are extensive, though they are only beginning to enter the marketplace. Resonators show promise and already offer superior performance in various WDM channel add/drop applications and other applications requiring high-order bandpass/bandstop filtering, sensors, etc.

Although the present invention has been shown and described with respect to several preferred embodiments thereof, various changes, omissions and additions to the form and detail thereof, may be made therein, without departing from the spirit and scope of the invention.

What is claimed is:

1. An optical filter comprising:
   a first and second optical waveguide,
   an optical resonating structure optically coupled to said first waveguide to define a first energy coupling coefficient, and to said second waveguide to define a last energy coupling coefficient,
   the optical resonating structure including a plurality of N series-coupled resonators defining a plurality of N−1 resonator-to-resonator energy coupling coefficients $\mu_1^2, \mu_2^2, \ldots, \mu_{N-1}^2$,
   the plurality of resonators including at least three resonators,
   wherein the sequence of N−1 resonator-to-resonator energy coupling coefficients $\mu_1^2, \mu_2^2, \ldots, \mu_{N-1}^2$ of the optical resonating structure is an asymmetric sequence of values.

2. The optical filter of claim 1, wherein all the resonators have identical FSRs.

3. The optical filter of claim 1 wherein the sequence of N+1 energy coupling coefficients $1/\tau_e, \mu_1^2, \mu_2^2, \ldots, \mu_{N-1}^2$, $1/\tau_d$ defined by the first resonator-to-resonator energy coupling coefficient, the plurality of N−1 resonator-to-resonator energy coupling coefficients of the resonators and the last energy coupling coefficient is an asymmetric sequence of values.

4. A multistage optical filter comprising a plurality of incoherently-cascaded filter stages, wherein at least one filter stage comprises an optical filter according to claim 1.

5. A multistage optical filter according to claim 4, wherein:
   each filter stage has an associated set of input ports and output ports; and wherein the stages are incoherently cascaded such that for each stage except a first stage, the input port is connected to the output port of another stage; for each stage except the last the output port is connected to the input port of another stage; and there is no optical feedback between stages.

6. A method for designing an optical filter having associated drop-port and through-port spectral responses and comprising:
   a first and a second optical waveguide structure; and
   an optical resonating structure optically coupled to said first optical waveguide structure so as to define a first energy coupling coefficient $1/\tau_e$ and to said second optical waveguide structure so as to define a last energy coupling coefficient $1/\tau_d$, the optical resonating structure including a plurality of N series-coupled resonators defining a plurality of N−1 energy coupling coefficients $\mu_1^2, \mu_2^2, \ldots, \mu_{N-1}^2$, a plurality of N resonator losses $1/\tau_{01}, 1/\tau_{02}, \ldots, 1/\tau_{0N}$ and a plurality of N resonance frequencies $\omega_1, \ldots, \omega_N$ of the resonators,
   the method comprising the steps of:
   designing an ideal lossless optical filter comprising a first and a second ideal optical waveguide structure, and an ideal optical resonating structure coupled to said first ideal optical waveguide structure so as to define a first ideal energy coupling coefficient $1/\tau'_e$ and to said second ideal optical waveguide structure so as to define a last ideal energy coupling coefficient $1/\tau'_d$, the ideal optical resonating structure including a plurality of N ideal lossless series-coupled resonators defining a plurality of N−1 ideal energy coupling coefficients $\mu'^2_1, \mu'^2_2, \ldots, \mu'^2_{N-1}$ and a plurality of ideal resonance frequencies $\omega'_1, \ldots, \omega'_N$, the terms $1/\tau'_e, \mu'^2_1, \mu'^2_2, \ldots, \mu'^2_{N-1}, 1/\tau'_d$ being selected so that the spectral response of the drop-port of the ideal lossless filter has a shape equal to said drop-port spectral response associated to said optical filter; said ideal resonance frequencies and ideal energy coupling coefficients defining the values of a set of N complex-valued poles of the lossless filter response functions;
   evaluating the alteration of said N complex-valued poles when said plurality of N resonator losses $1/\tau_{01}, 1/\tau_{02}, \ldots, 1/\tau_{0N}$ is introduced in the drop-port response function of said ideal lossless optical filter;
   assigning corrections to the terms $1/\tau'_e, \mu'^2_1, \mu'^2_2, \ldots, \mu'^2_{N-1}, 1/\tau'_d$, thus resulting in said set of energy coupling coefficients $1/\tau_e, \mu_1^2, \mu_2^2, \ldots, \mu_{N-1}^2, 1/\tau_d$ of said optical filter, so as to restore said values of the N complex-valued poles of the ideal lossless filter response functions, and therefore restore the drop-port response shape.

7. A method based on the method of claim 6, where in addition
   one of the N+1 terms $1/\tau'_e, \mu'^2_1, \mu'^2_2, \ldots, \mu'^2_{N-1}, 1/\tau'_d$ is varied continuously;

the remaining N terms are uniquely varied, keeping them positive-real valued, so that the complex-plane pole locations remain unchanged during the variation.

8. The method of claim 7, wherein the value of said one varied term is chosen so that the insertion loss of the drop port is unchanged upon a small change of the varied term.

9. The method of claim 8, wherein a value among several possible values of said one varied term is chosen such that the insertion loss is at a minimum.

10. The method of claim 7, wherein a value among several possible values of said one varied term is chosen such that $1/\tau_e > 1/\tau_d$.

11. The method of claim 7, wherein a value among several possible values of said one varied term is chosen such that $1/\tau_e < 1/\tau_d$.

12. An optical filter having associated drop-port and through-port spectral responses and comprising:
- a first and a second optical waveguide structure; and
- an optical resonating structure optically coupled to said first optical waveguide structure so as to define a first energy coupling coefficient $1/\tau_e$ and to said second optical waveguide structure so as to define a last energy coupling coefficient $1/\tau_d$,
- the optical resonating structure including a plurality of N series-coupled resonators defining a plurality of N−1 energy coupling coefficients $\mu^2_1, \mu^2_2, \ldots, \mu^2_{N-1}$, a plurality of N resonator losses $1/\tau_{01}, 1/\tau_{02}, \ldots, 1/\tau_{0N}$ and a plurality of N resonance frequencies $\omega_1, \ldots, \omega_N$ of the resonators, wherein the set of N+1 energy coupling coefficients defined by the first energy coupling coefficient, the plurality of N−1 energy coupling coefficients of the resonators and the last coupling coefficient are selected so that the following expression in a complex frequency $\omega$:

$$j(\omega - \omega_1) + \frac{1}{\tau_{01}} + \frac{1}{\tau_e} + \cfrac{\mu_1^2}{j(\omega - \omega_2) + \cfrac{1}{\tau_{02}} + \cfrac{\mu_2^2}{j(\omega - \omega_3) + \cfrac{1}{\tau_{03}} + \ldots + \cfrac{\mu_{N-1}^2}{j(\omega - \omega_N) + \cfrac{1}{\tau_{0N}} + \cfrac{1}{\tau_d}}}},$$

has the same zeros in $\omega$ as the following expression:

$$j(\omega - \omega'_1) + \frac{1}{\tau'_e} + \cfrac{\mu'^2_1}{j(\omega - \omega'_2) + \cfrac{\mu'^2_2}{j(\omega - \omega'_3) + \ldots + \cfrac{\mu'^2_{N-1}}{j(\omega - \omega'_N) + \cfrac{1}{\tau'_d}}}},$$

the zeros of the latter expression representing the poles of a drop-port spectral response of an ideal lossless optical filter having:
- a first and a second ideal optical waveguide structure,
- an ideal optical resonating structure coupled to said first ideal optical waveguide structure so as to define a first ideal energy coupling coefficient $1/\tau'_e$ and to said second ideal optical waveguide structure so as to define a last ideal energy coupling coefficient $1/\tau'_d$,
- the ideal optical resonating structure including a plurality of N series-coupled ideal resonators defining a plurality of N−1 ideal energy coupling coefficients $\mu'^2_1, \mu'^2_2, \ldots, \mu'^2_{N-1}$ and a plurality of ideal resonance frequencies $\omega'_1, \ldots, \omega'_N$, the terms $1/\tau'_e, \mu'^2_1, \mu'^2_2, \ldots, \mu'^2_{N-1}, 1/\tau'_d$ and $\omega'_1, \ldots, \omega'_N$ being selected so that the terms $1/\tau'_e, \mu'^2_1, \mu'^2_2, \ldots, \mu'^2_{N-1}, 1/\tau'_d$ are a symmetric sequence of values and so that the spectral response of the drop-port of the ideal lossless filter has the same shape of the spectral response of the drop-port of said optical filter, and wherein at least one of the ideal energy coupling coefficients $1/\tau'_e, \mu'^2_1, \mu'^2_2, \ldots, \mu'^2_{N-1}, 1/\tau'_d$ is different from the at least one corresponding energy coupling coefficient in the set $1/\tau_e, \mu^2_1, \mu^2_2, \ldots, \mu^2_{N-1}, 1/\tau_d$.

13. The optical filter of claim 12 wherein the sequence of N−1 energy coupling coefficients $\mu^2_1, \mu^2_2, \ldots, \mu^2_{N-1}$ is an asymmetric sequence of values.

14. The optical filter of claim 12 wherein the sequence of N+1 energy coupling coefficients $1/\tau_e, \mu^2_1, \mu^2_2, \ldots, \mu^2_{N-1}, 1/\tau_d$ is an asymmetric sequence of values.

15. The optical filter of claim 12 wherein said drop-port spectral response of said ideal lossless optical filter has a flat-top shape.

16. The optical filter of claim 15 wherein said drop-port spectral response of said ideal lossless optical filter is maximally flat.

17. The optical filter of claim 15 wherein said drop-port spectral response of said ideal lossless optical filter is equiripple.

18. The optical filter of claim 15 wherein the energy coupling coefficients $1/\tau_e, \mu^2_1, \mu^2_2, \ldots, \mu^2_{N-1}, 1/\tau_d$ are further selected so that an insertion loss of said optical filter is at minimum.

19. The optical filter of claim 12 wherein the energy coupling coefficients $1/\tau_e, \mu^2_1, \mu^2_2, \ldots, \mu^2_{N-1}, 1/\tau_d$ are further selected so that the first coupling coefficient is stronger than the last coupling coefficient.

20. The optical filter of claim 12 wherein the energy coupling coefficients $1/\tau_e, \mu^2_1, \mu^2_2, \ldots, \mu^2_{N-1}, 1/\tau_d$ are further selected so that the first coupling coefficient is weaker than the last coupling coefficient.

21. The optical filter of claim 12 wherein said plurality of series-coupled optical resonators comprises microring resonators.

22. The optical filter of claim 12 wherein said ideal resonance frequencies $\omega'_1, \ldots, \omega'_N$ of the ideal lossless optical filter are equal to said resonance frequencies $\omega_1, \ldots, \omega_N$ of said optical filter.

23. The optical filter of claim 12 wherein said resonance frequencies $\omega_1, \ldots, \omega_N$ of said optical filter are equal.

24. A multistage optical filter comprising a plurality of incoherently-cascaded filter stages, wherein at least one filter stage comprises an optical filter according to claim 12.

25. A multistage optical filter according to claim 24, wherein:
- each filter stage has an associated set of input ports and output ports; and wherein the stages are incoherently cascaded such that for each stage except a first stage, the input port is connected to the output port of another stage; for each stage except the last the output port is connected to the input port of another stage; and there is no optical feedback between stages.

26. The multistage optical filter of claim 24 comprising at least a first and a second filter stage, wherein said first filter stage comprises said optical filter according to claim 1, and the second filter stage comprises a further filter comprising at least one optical waveguide structure and an optical resonating structure coupled to said at least one optical waveguide structure so as to define a first energy coupling coefficient $1/\tau_{e2}$, the optical resonating structure including a plurality N of series-coupled optical resonators defining a plurality N−1 of coupling coefficients, wherein said plurality N−1 of coupling coefficients produce an asymmetric distribution of coupling coefficients which is different from the respective distribution of coupling coefficients of the first filter stage.

27. The multistage optical filter of claim 24 comprising at least a first and a second filter stage, wherein said first filter stage comprises said optical filter according to claim 1, and the second filter stage comprises a further filter comprising a first and a second optical waveguide structure and an optical resonating structure, wherein the optical resonating structure is coupled to said first optical waveguide structure so as to define a first energy coupling coefficient $1/\tau_{e2}$, and coupled to said second optical waveguide structure so as to define a second coupling coefficient $1/\tau_{d2}$, the optical resonating structure including a plurality N of series-coupled optical resonators defining a plurality N−1 of coupling coefficients, wherein said first coupling coefficient, the plurality N−1 of coupling coefficients and the last coupling coefficient produce an asymmetric distribution of coupling coefficients which is different from the respective distribution of coupling coefficients of the first filter stage.

28. The multistage optical filter of claim 24 further comprising a third filter stage incoherently cascaded to the second filter stage, wherein the third filter stage has a distribution of coupling coefficients equal to the respective distribution of coupling coefficients of the first filter stage.

* * * * *